US012477077B2

(12) United States Patent
Lee et al.

(10) Patent No.: US 12,477,077 B2
(45) Date of Patent: Nov. 18, 2025

(54) METHOD AND APPARATUS FOR RENDERING LIGHT FIELD IMAGE

(71) Applicant: SAMSUNG ELECTRONICS CO., LTD., Suwon-si (KR)

(72) Inventors: Jihye Lee, Suwon-si (KR); Kyungmin Lim, Suwon-si (KR); Bora Jin, Suwon-si (KR); Cheolseong Park, Suwon-si (KR); Youngjin Yoon, Suwon-si (KR); Yeoul Lee, Suwon-si (KR); Jaesung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 18/110,067

(22) Filed: Feb. 15, 2023

(65) Prior Publication Data
US 2023/0199136 A1     Jun. 22, 2023

Related U.S. Application Data

(63) Continuation of application No. PCT/KR2022/018481, filed on Nov. 22, 2022.

(30) Foreign Application Priority Data

Nov. 29, 2021   (KR) ........................ 10-2021-0167724

(51) Int. Cl.
*G06T 7/557*       (2017.01)
*G06T 3/4007*      (2024.01)
(Continued)

(52) U.S. Cl.
CPC ........... *H04N 5/265* (2013.01); *G06T 3/4007* (2013.01); *G06T 7/10* (2017.01); *G06T 7/557* (2017.01);
(Continued)

(58) Field of Classification Search
CPC .. H04N 2013/0081; G06N 3/08; G06T 7/557; G06T 2207/20084; G06T 7/70;
(Continued)

(56) References Cited

U.S. PATENT DOCUMENTS 8,848,006 B2    9/2014   Wetzstein et al.
9,544,514 B2    1/2017   Namboodiri et al.
(Continued)

FOREIGN PATENT DOCUMENTS

CN     111127536 A     5/2020
CN     112866676 A     5/2021
(Continued)

OTHER PUBLICATIONS

European Extended Search Report issued Nov. 27, 2024 by the European Patent Office for EP Patent Application No. 22898985.1.
(Continued)

*Primary Examiner* — Chante E Harrison
(74) *Attorney, Agent, or Firm* — Sughrue Mion, PLLC

(57) ABSTRACT

Provided is an electronic device, wherein the at least one processor is configured to execute the at least one instruction to obtain a first light field image including view images with a first number of views, obtain, from the first light field image, a second light field image including view images with a second number of views, obtain first location information corresponding to each of sub-pixels in the second light field image, obtain a first layer image by inputting the second light field image and the first location information to an artificial intelligence model configured to perform factorization, obtain a third light field image including view images with a third number of views by inputting the first layer image to a simulation model, and train the artificial (Continued)

intelligence model, based on a result of comparing the first light field image and the third light field image with each other.

20 Claims, 26 Drawing Sheets

(51) Int. Cl.
  *G06T 7/10* (2017.01)
  *G06V 10/74* (2022.01)
  *H04N 5/265* (2006.01)
  *H04N 23/957* (2023.01)
(52) U.S. Cl.
  CPC ......... *G06V 10/761* (2022.01); *H04N 23/957* (2023.01); *G06T 2207/10052* (2013.01); *G06T 2207/20081* (2013.01); *G06T 2207/20084* (2013.01); *G06T 2207/20228* (2013.01)
(58) Field of Classification Search
  CPC ......... G06T 15/00; G06T 15/10; G06V 10/20; G06V 10/454
  See application file for complete search history.

(56) References Cited

U.S. PATENT DOCUMENTS

| 11,575,882 | B2 | 2/2023 | Jin et al. |
|---|---|---|---|
| 2014/0063077 | A1 | 3/2014 | Wetzstein et al. |
| 2015/0035880 | A1 | 2/2015 | Heide et al. |
| 2015/0172641 | A1 | 6/2015 | Nakamura et al. |
| 2016/0261809 | A1 | 9/2016 | Namboodiri et al. |
| 2016/0335795 | A1 * | 11/2016 | Flynn .................. G06V 10/764 |
| 2018/0352216 | A1 | 12/2018 | Suginohara et al. |
| 2021/0203917 | A1 | 7/2021 | Jin et al. |
| 2021/0314545 | A1 | 10/2021 | Milyukov et al. |
| 2022/0208047 | A1 | 6/2022 | Jin et al. |

FOREIGN PATENT DOCUMENTS

| JP | 2015-119203 A | 6/2015 | |
|---|---|---|---|
| JP | WO2016/121233 A1 | 8/2016 | |
| JP | 6395870 B2 | 9/2018 | |
| KR | 10-2011-0082380 A | 7/2011 | |
| KR | 10-2020-0021891 A | 3/2020 | |
| KR | 10-2021-0084230 A | 7/2021 | |
| KR | 10-2294806 B1 | 8/2021 | |
| KR | 10-2022-0092247 A | 7/2022 | |
| WO | WO-2023096303 A1 * | 6/2023 | ............... G06N 3/08 |

OTHER PUBLICATIONS

International Search Report and Written Opinion issued Mar. 6, 2023 by the International Searching Authority in counterpart International Patent Application No. PCT/KR2022/018481 (PCT/ISA/220, PCT/ISA/210 and PCT/ISA/237).

Wu et al., "Light Field Reconstruction Using Deep Convolutional Network on EPI," CVF, Jul. 2017, (9 total pages).

Takahashi et al., "From Focal Stack to Tensor Light-Field Display," IEEE Transactions on Image Processing, vol. 27, No. 9, Sep. 2018, (14 total pages).

Zhang et al., "Light-Field Depth Estimation via Epipolar Plane Image Analysis and Locally Linear Embedding," IEEE Transactions on Circuits and Systems for Video Technology, vol. 27, No. 4, Apr. 2017 (9 total pages).

Wetzstein et al., "Layered 3D: Tomographic Image Synthesis for Attenuation-based Light Field and High Dynamic Range Displays," Jul. 2011 (11 pages).

* cited by examiner

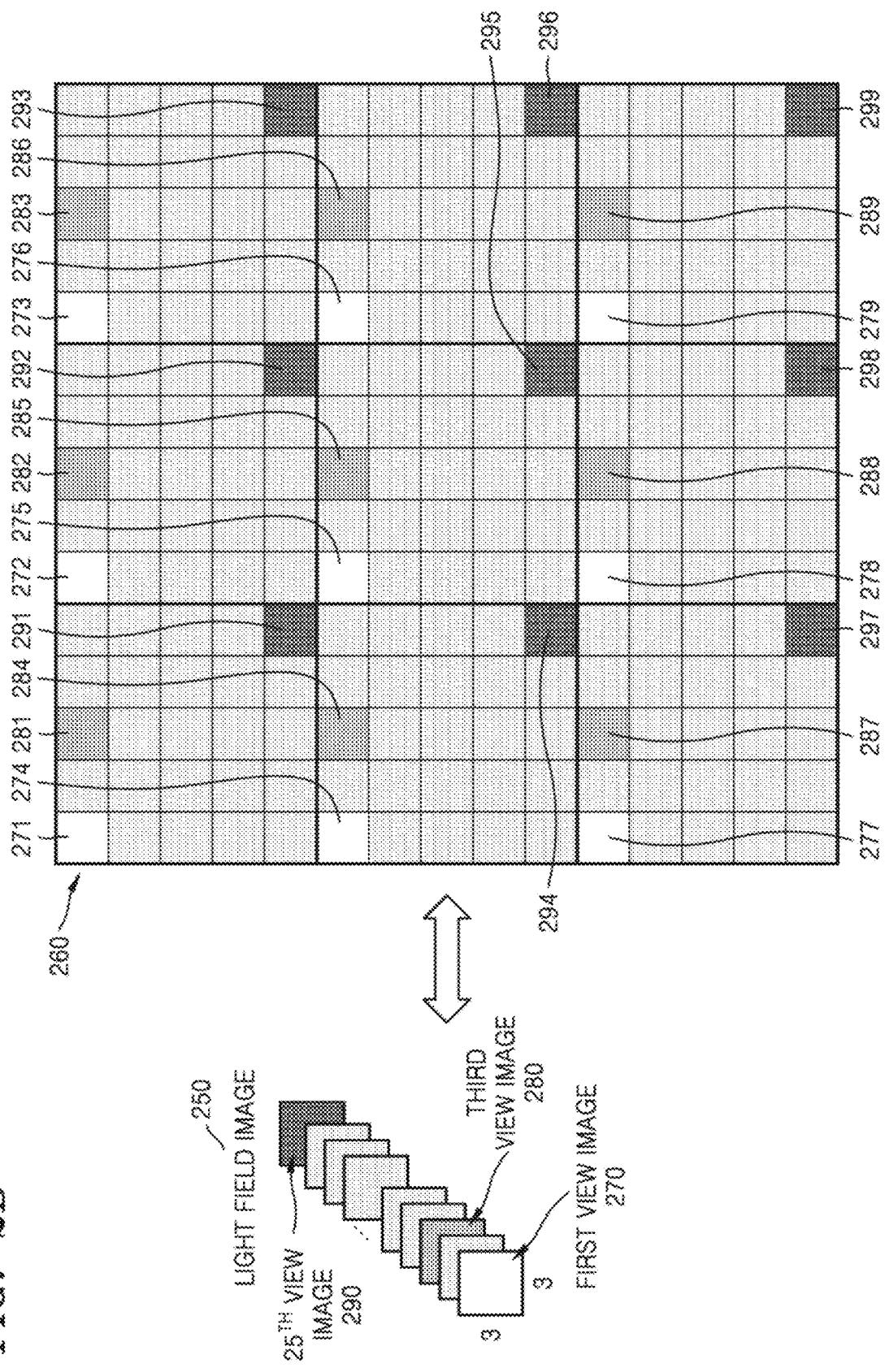

FIG. 5B
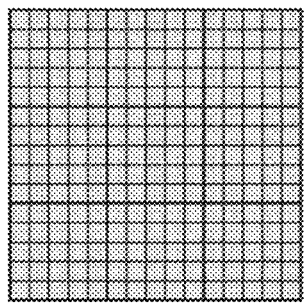
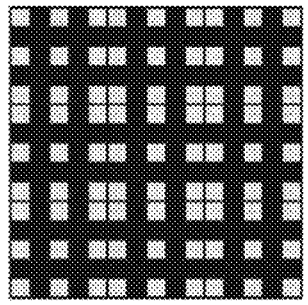
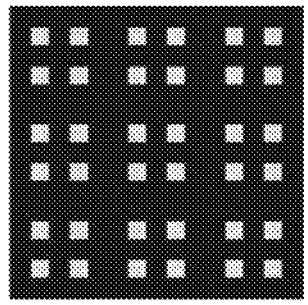
SECOND LIGHT FIELD IMAGE
|
515
SECOND LIGHT FIELD IMAGE
|
525
SECOND LIGHT FIELD IMAGE
|
535

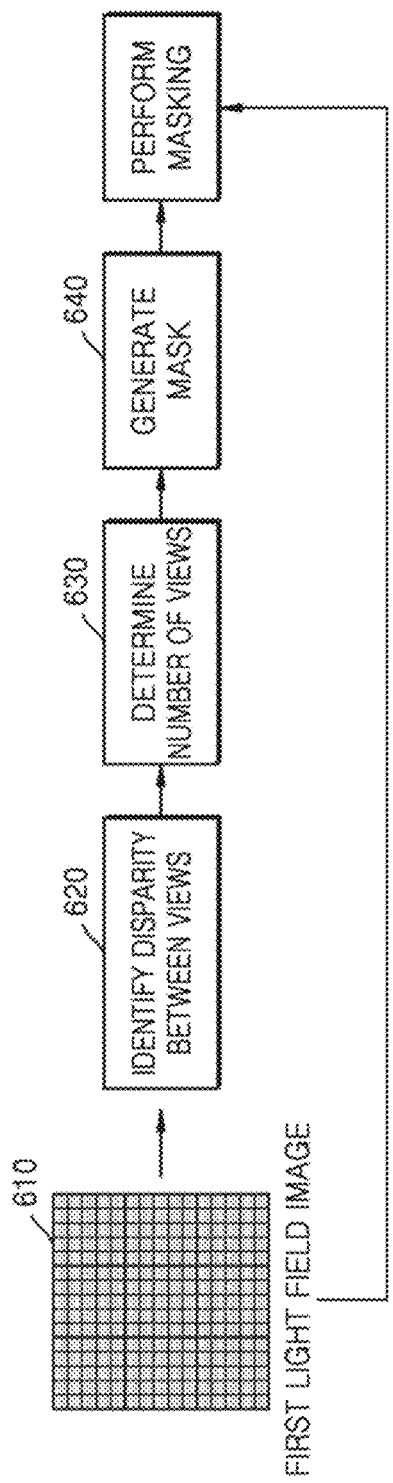

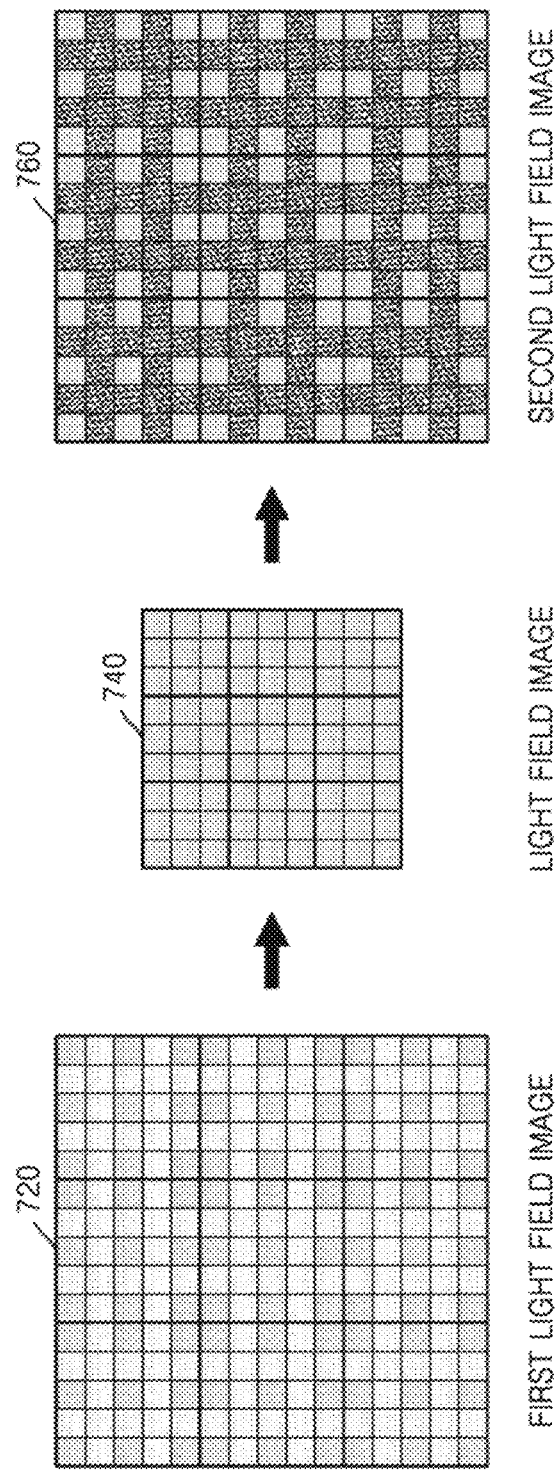

METHOD AND APPARATUS FOR RENDERING LIGHT FIELD IMAGE

CROSS REFERENCE TO RELATED APPLICATION(S)

This application is a bypass continuation of international application PCT/KR2022/018481 filed Nov. 22, 2022 and claims priority to Korean Patent Application No. 10-2021-0167724 filed on Nov. 29, 2021 in the Korean Intellectual Property Office; the above applications are hereby incorporated by reference.

TECHNICAL FIELD

The disclosure relates to a method of rendering a light field image and an electronic device therefor.

BACKGROUND ART

Recently, a method of displaying an image by using a stacked display to represent a stereoscopic effect of the image has been proposed. The stacked display may be formed by stacking a plurality of display panels and provide an image in which a three-dimensional (3D) depth is reflected as images are displayed on the plurality of display panels. Specifically, in the stacked display, a layer image may be obtained by inputting light field images captured from different viewpoints to an artificial intelligence model performing factorization and be thereafter rendered.

However, an artificial intelligence model of the related art has limitations in that factorization can be performed only on a light field images with a certain number of views used in training the artificial intelligence model. Accordingly, when the number of views of an input light field image is changed due to a change of an environment in which the input light field image is obtained, the artificial intelligence model should be trained again. When the number of views of a light field image for representing a certain viewing angle is fixed, a time required to obtain an input light field image increases in the case of an image from a wide viewing angle.

SUMMARY

The disclosure provides a method of rendering a light field image and an electronic device therefor.

An aspect of the disclosure provides an electronic device including a memory storing at least one instruction and at least one processor, wherein the at least one processor is configured to execute the at least one instruction to obtain a first light field image including view images with a first number of views, obtain, from the first light field image, a second light field image including view images with a second number of views, obtain first location information corresponding to each of sub-pixels in the second light field image, obtain a first layer image by inputting the second light field image and the first location information to an artificial intelligence model for performing factorization, obtain a third light field image including view images with a third number of views by inputting the first layer image to a simulation model, and train the artificial intelligence model, based on a result of comparing the first light field image and the third light field image.

In an embodiment of the disclosure, during the obtaining of the second light field image from the first light field image, the at least one processor may be further configured to perform masking or interpolation on the first light field image with the first number of views to obtain the second light field image with the second number of views, and the first number of views may be different from the second number of views.

In an embodiment of the disclosure, during the obtaining of the second light field image with the second number of views by performing masking on the first light field image, the at least one processor is further configured to determine the second number of views, based on a disparity between views of the first light field image, generate a mask, based on the second number of views, and perform masking on the first light field image, based on the generated mask.

In an embodiment of the disclosure, during the obtaining of the second light field image with the second number of views by performing masking on the first light field image, the at least one processor may be further configured to determine the second number of views, based on a user input, generate a mask, based on the second number of views, and perform masking on the first light field image, based on the generated mask.

In an embodiment of the disclosure, during the obtaining of the second light field image with the second number of views by performing interpolation on the first light field image, the at least one processor may be further configured to perform interpolation on a sub-sampled light field image obtained by performing sub-sampling on the first light field image.

In an embodiment of the disclosure, the at least one processor may be further configured to obtain a fourth light field image with a fourth number of views, when the fourth number of views is less than a number of views corresponding to a viewing angle of a display, obtain a fifth light field image with a same number of formats as the number of views corresponding to the viewing angle of the display by changing a format of the fourth light field image, obtain second location information corresponding to each sub-pixel of a plurality of sub-pixels in the fourth light field image or the fifth light field image, and obtain a second layer image by inputting one of the fourth light field image and the fifth light field image and the second location information to the trained artificial intelligence model.

In an embodiment of the disclosure, during the obtaining of the fifth light field image, the at least one processor may be further configured to perform masking on the fourth light field image to obtain the fifth light field image when a disparity between views of the fourth light field image is not uniform.

In an embodiment of the disclosure, during the obtaining of the fifth light field image, the at least one processor is further configured to perform masking or interpolation on the fourth light field image to obtain the fifth light field image when a disparity between views of the fourth light field image is uniform.

In an embodiment of the disclosure, the electronic device may further include the display, and the at least one processor may be further configured to render the second layer image on the display.

In an embodiment of the disclosure, the electronic device may further include a transceiver, the at least one processor may be further configured to transmit the second layer image to the display through the transceiver, and the second layer image may be rendered on the display.

Another aspect of the disclosure provides a method including obtaining a first light field image including view images with a first number of views, obtaining, from the first light field image, a second light field image including view images with a second number of views, obtaining first location information corresponding to each of sub-pixels in the second light field image, obtaining a first layer image by inputting the second light field image and the first location information to an artificial intelligence model for performing factorization, obtaining a third light field image including view images with a third number of views, by inputting the first layer image to a simulation model, and training the artificial intelligence model, based on a result of comparing the first light field image and the third light field image.

In an embodiment of the disclosure, the obtaining of the second light field image with the second number of views from the first light field image may include obtaining the second light field image with the second number of views by performing masking or interpolation on the first light field image with the first number of views, and the first number of views may be different from the second number of views.

In an embodiment of the disclosure, the obtaining of the second light field image with the second number of views by performing masking on the first light field image may include determining the second number of views, based on a disparity between the views of the first light field image, producing a mask, based on the second number of views, and performing masking on the first light field image, based on the generated mask.

In an embodiment of the disclosure, the obtaining of the second light field image with the second number of views by performing masking on the first light field image may include determining the second number of views, based on a user input, producing a mask, based on the second number of views, and performing masking on the first light field image, based on the generated mask.

In an embodiment of the disclosure, the obtaining of the second light field image with the second number of views by performing interpolation on the first light field image may include performing interpolation on a light field image obtained by performing sub-sampling on the first light field image.

In an embodiment of the disclosure, the method may further include obtaining a fourth light field image with a fourth number of views, when the fourth number of views is less than the number of views corresponding to a viewing angle of a display, obtaining a fifth light field image with a same number of formats as the number of views corresponding to the viewing angle of the display by changing a format of the fourth light field image, obtaining second location information corresponding to each of sub-pixels in the fourth light field image or the fifth light field image, and obtaining a second layer image by inputting one of the fourth light field image and the fifth light field image and the second location information to the trained artificial intelligence model.

In an embodiment of the disclosure, the obtaining of the fifth light field image may include obtaining the fifth light field image by performing masking on the fourth light field image when a disparity between the views of the fourth light field image is not uniform.

In an embodiment of the disclosure, the obtaining of the fifth light field image may include obtaining the fifth light field image by performing masking or interpolation on the fourth light field image when a disparity between the views of the fourth light field image is uniform.

In an embodiment of the disclosure, the method may further include rendering the second layer image on the display.

In an embodiment of the disclosure, the method may further include transmitting the second layer image to the display through a transceiver.

Another aspect of the disclosure, there is provided a non-transitory computer-readable recording medium having recorded thereon a program for implementing the method executed by an electronic device.

BRIEF DESCRIPTION OF DRAWINGS

FIG. 2B illustrates examples of a light field image and a layer image according to an embodiment of the disclosure.

FIG. 5B is a diagram for describing a process of performing masking on a light field image by an electronic device according to an embodiment of the disclosure.

FIG. 6A is a diagram for describing a process of performing masking on a light field image by an electronic device according to an embodiment of the disclosure.

FIG. 7 is a diagram for describing a process of performing interpolation on a light field image by an electronic device according to an embodiment of the disclosure.

DETAILED DESCRIPTION

Figure 1:
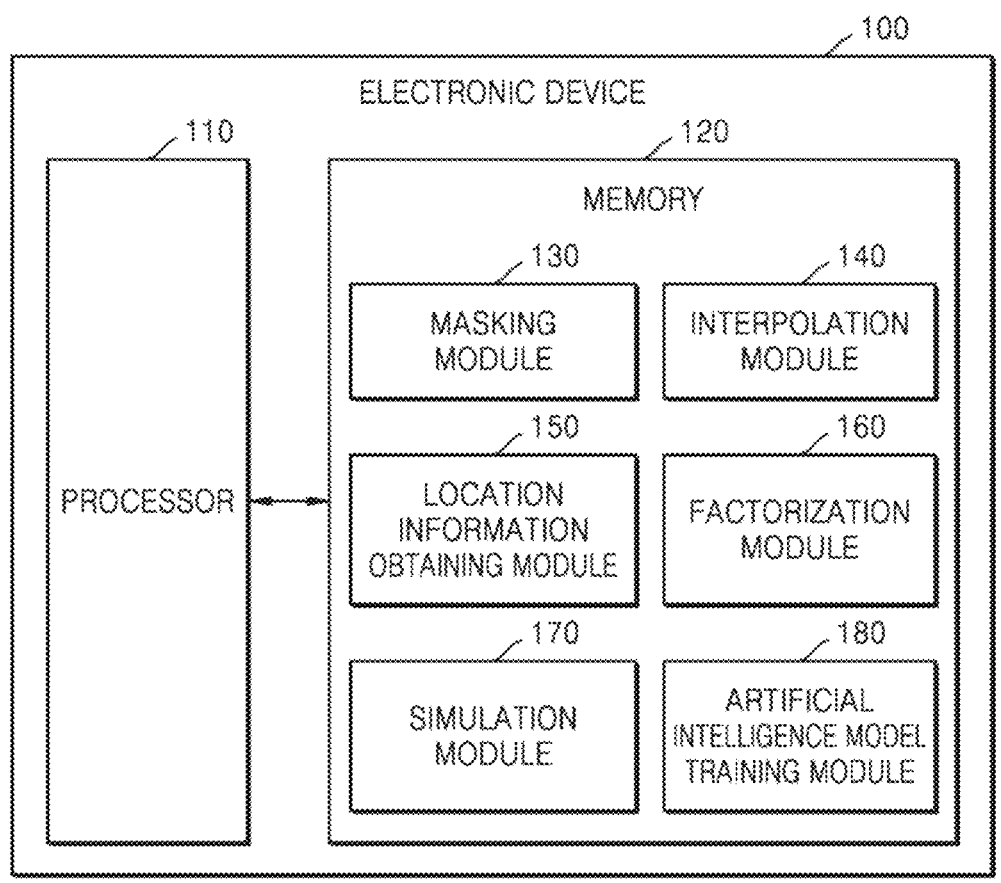
FIG. 1 is a block diagram of an electronic device according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

When embodiments of the disclosure are described below, a description of techniques that are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numerals are allocated to the same or corresponding elements in each drawing.

Advantages and features of the disclosure and methods of achieving them will be apparent from embodiments of the disclosure described in detail in conjunction with the accompanying drawings. However, the disclosure is not limited to the embodiments of the disclosure below and may be embodied in many different forms. Rather, the embodiments of the disclosure are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in block(s) of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in block(s) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes at least one executable instruction for executing specified logical function(s). It should be noted that in some alternative embodiments of the disclosure, the functions described in the blocks may be performed in an order different from that described herein. For example, two blocks illustrated consecutively may be performed substantially simultaneously or performed in a reverse order according to functions corresponding thereto in some cases.

In the disclosure, a machine-readable storage medium may be provided in the form of a non-transitory storage medium. Here, the term "non-transitory storage medium" should be understood to mean a tangible device and to not include a signal (e.g., electromagnetic waves) but is not intended to distinguish between a case in which data is semi-permanently stored in the storage medium and a case in which data is temporarily stored in the storage medium. For example, the 'non-transitory storage medium' may include a buffer to temporarily store data.

In an embodiment of the disclosure, methods according to various embodiments of the disclosure may be provided by being included in a computer program product. The computer program product may be traded as a product between a seller and a purchaser. The computer program product may be distributed in the form of a storage medium (e.g., compact disc read only memory (CD-ROM)) that is readable by devices, may be distributed through an application store (e.g., Play Store™) or directly between two user devices (e.g., smartphones), or may be distributed online (e.g., by downloading or uploading). In the case of an online distribution, at least part of the computer program product (e.g., a downloadable application) may be at least temporarily stored or temporarily generated in a storage medium readable by devices such as the manufacturer's server, a server of an application store, or a memory of a relay server.

In the disclosure, sub-pixels constituting one pixel may be understood to mean sub-pixels of one of R, G and B color components of the pixel or sub-pixels of one of Y, U and V color components of the pixel. In the disclosure, sub-pixels at a certain position in a plurality of images may be understood to mean sub-pixels of one of R, G and B color components of pixels at the same position in the plurality of images or sub-pixels of one of Y, U and V color components of the pixels at the same position in the plurality of images. The definition is based on an assumption that an embodiment of the disclosure conforms to an RGB color format or a YUV color format, and when the embodiment of the disclosure conforms to another color format, sub-pixels may be understood to mean sub-pixels of one of other color components.

FIG. 1 is a block diagram of an electronic device 100 according to an embodiment of the disclosure.

In an embodiment of the disclosure, the electronic device 100 may include a processor 110 and a memory 120. However, components of the electronic device 100 are not limited thereto, and the electronic device 100 may further include other components or include only some of the components described above.

The processor 110 may execute at least one instruction stored in the memory 120 to control overall operations of the electronic device 100.

For example, the processor 110 may obtain a first light field image including view images with a first number of views.

The processor 110 may obtain a second light field image including view images with a second number of views from the first light field image.

The processor 110 may obtain first location information corresponding to each of sub-pixels in the second light field image.

The processor 110 may obtain a first layer image by inputting the second light field image and the first location information to an artificial intelligent model for performing factorization.

The processor 110 may obtain a third light field image including view images with a third number of views by inputting the first layer image to a simulation model.

The processor 110 may train the artificial intelligence model, based on a result of comparing the first light field image and the third light field image.

The memory 120 may include a masking module 130, an interpolation module 140, a location information obtaining module 150, a factorization module 160, a simulation module 170, and an artificial intelligence model training module 180.

The masking module 130 may store instructions for performing masking on the first light field image including the view images with the first number of views to obtain the second light field image including the view images with the second number of views.

The interpolation module 140 may store instructions for performing interpolation on the first light field image including the view images with the first number of views to obtain the second light field image including the view images with the second number of views.

The location information obtaining module 150 may store instructions for obtaining the first location information corresponding to each of the sub-pixels in the second light field image.

The factorization module 150 may store instructions for inputting the second light field image and the first location information to the artificial intelligence model for performing factorization so as to obtain the first layer image.

The simulation model 160 may store instructions for inputting the first layer image to a simulation model to obtain the third light field image including the view images with the third number of views.

The artificial intelligence model training module 170 may store instructions for training an artificial intelligence model, based on a result of comparing the first light field image and the third light field image.

According to an embodiment of the disclosure, the electronic device 100 may include a camera (not shown). For example, the camera may include a light field camera, and the light field camera may obtain the first light field image with the view images with the first number of views.

According to an embodiment of the disclosure, the electronic device 100 may include a display (not shown). For example, the display may include a stacked display. The stacked display may be, but is not limited to, embodied as various forms such as a TV, a monitor, a smart phone, a portable multimedia device, a portable communication device, smart glasses, a smart window, a smart watch, a head-mounted display (HMD), a wearable device, a portable device, a handheld device, a signage, an electric sign, a billboard, a cinema screen, a video wall, etc.

According to an embodiment of the disclosure, when the electronic device 100 includes a display, the electronic device 100 may render a layer image on the display. For example, the stacked display may include a plurality of panels and a layer image may be displayed on each of the plurality of panels. That is, the electronic device 100 may display a layer image on each of the panels of the stacked display to provide a three-dimensional (3D) image.

According to an embodiment of the disclosure, the electronic device 100 may include a transceiver (not shown). The transceiver may communicate with an external device to transmit data to or receive data from the external device. For example, the transceiver may establish at least one wireless communication method among various methods such as cellular communication employing at least one of long-term evolution (LTE), LTE Advance (LTE-A), code division multiple access (CDMA), wideband CDMA (WCDMA), universal mobile telecommunications system (UMTS), wireless broadband (WiBro) or global system for mobile communications (GSM), wireless fidelity (WiFi), Bluetooth, Bluetooth low energy (BLE), Zigbee, near-field communication (NFC), etc. Alternatively, the transceiver may establish at least one wired communication method among various methods such as universal serial bus (USB), high-definition multimedia interface (HDMI), digital visual interface (DVI), thunderbolt, ethernet, USB port, lightning, etc.

According to an embodiment of the disclosure, when the electronic device 100 includes the transceiver, the electronic device 100 may receive a light field image from an external light field camera or an external electronic device (e.g., a server). When the electronic device 100 includes the transceiver, the electronic device 100 may transmit a layer image to or receive a layer image from an external electronic device with a display.

Figure 2A:
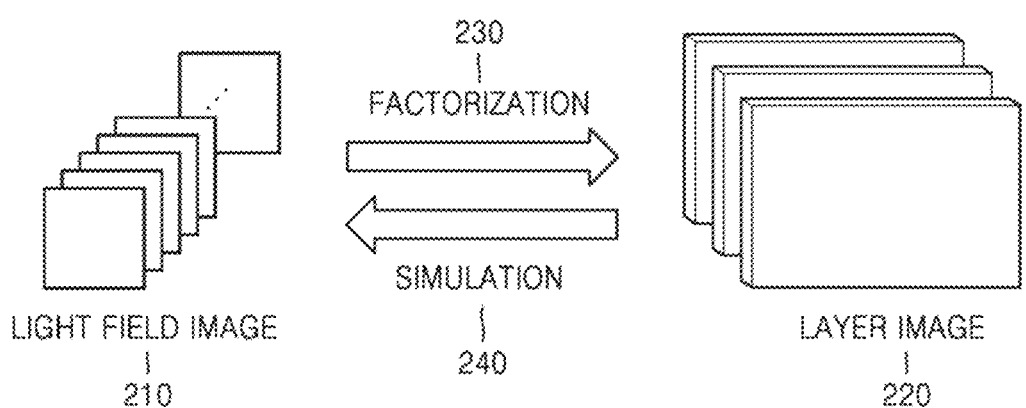
FIG. 2A illustrates examples of a light field image and a layer image according to an embodiment of the disclosure.

FIG. 2A illustrate examples of a light field image and a layer image according to an embodiment of the disclosure. FIG. 2B illustrate examples of a light field image and a layer image according to an embodiment of the disclosure.

According to an embodiment of the disclosure, a light field image 210 may refer to a set of view images of at least one object photographed from different viewpoints through a light field camera. That is, a light field image may refer to a set of view images of light reflected from a certain object, which are captured from different viewpoints.

According to an embodiment of the disclosure, a layer image 220 is an image provided to a stacked display and may be an image for providing a user with another side of an object in the image according to the user's viewpoint (or the user's location). For example, when the user looking at the stacked display is moving in a left direction, the layer image 220 may provide more of the left side of the object to the user. The layer image may be referred to as a layer stack.

According to an embodiment of the disclosure, the layer image 220 may include images, the number of which is equal to the number of the panels of the stacked display. Accordingly, each of the images included in the layer image 220 may be displayed on one of the panels of the stacked display, and thus, a 3D image may be provided to the user. The layer image 220 provided to the stacked display including, for example, three panels may include a first image, a second image, and a third image. Accordingly, the first image, the second image, and the third image may be respectively displayed on a first panel, a second panel, and a third panel of the stacked display, and thus, a 3D image may be provided to the user.

Referring to FIG. 2A, according to an embodiment of the disclosure, the electronic device 100 may input the light field image 210 to an artificial intelligence model, which performs factorization 230, to obtain the layer image 220. The artificial intelligence model may include a plurality of neural network layers. Each of the neural network layers may be assigned a plurality of weight values, and an operation may be performed at each of the neural networks by using a result of an operation of a previous layer and the plurality of weight values. Examples of a neural network according to the disclosure may include, but are not limited to, a convolutional neural network (CNN), a deep neural network (DNN), a recurrent neural Network (RNN), a restricted Boltzmann machine (RBM), a deep belief network (DBN), a bidirectional recurrent deep neural network (BRDNN), and deep Q-networks.

Referring to FIG. 2A, according to an embodiment of the disclosure, the electronic device 100 may perform a simulation 240 to restore the light field image 210 from the layer image 220. For example, a first view image of the light field image 210 may be restored as the sum or product of pixels corresponding to a first view image in each image of the layer image 220. In this case, the correspondence of the pixels to the first view image may be understood to mean light for rendering the first view image passes through the pixels included in the display panel.

Referring to FIG. 2B, a light field image according to an embodiment of the disclosure may be embodied in various forms.

According to an embodiment of the disclosure, a light field image 250 may include 25 view images with a resolution of 3×3. For example, the light field image 250 may include a first view image 270, a second view image, a third view image 280, . . . , and a 25$^{th}$ view image 290. In this case, view images may refer to images corresponding to views included in a light field image.

According to an embodiment of the disclosure, the light field image 250 may be represented as a light field image 260 that is in the form of a micro lens array (MLA) image. The light field image 260 may be represented by grouping sub-pixels included in view images of the light field image 250 according to positions. For example, the light field image 250 may include 25 view images, and 25 sub-pixels at the same position in the 25 view images may be grouped into a 5×5 image. The view images of the light field image 250 have a resolution of 3×3 and thus the light field image 260 may include nine 5×5 images.

According to an embodiment of the disclosure, sub-pixels 271, 272, 273, 274, 275, 276, 277, 278, 279 included in the first view image 270 of the light field image 250 may be located at (0,0) coordinates of each of the 5×5 images in the light field image 260. Sub-pixels 281, 282, 283, 284, 285, 286, 287, 288, 289 included in the third view image 280 of the light field image 250 may be located at (0,2) coordinates of each of the 5×5 images in the light field image 260. Sub-pixels 291, 292, 293, 294, 295, 296, 297, 298, 299 included in the 25th view image 290 of the light field image 250 may be located at (4,4) coordinates of each of the 5×5 images in the light field image 260. However, this is merely an embodiment, the light field image 260 may be represented in a different manner.

Figure 3:
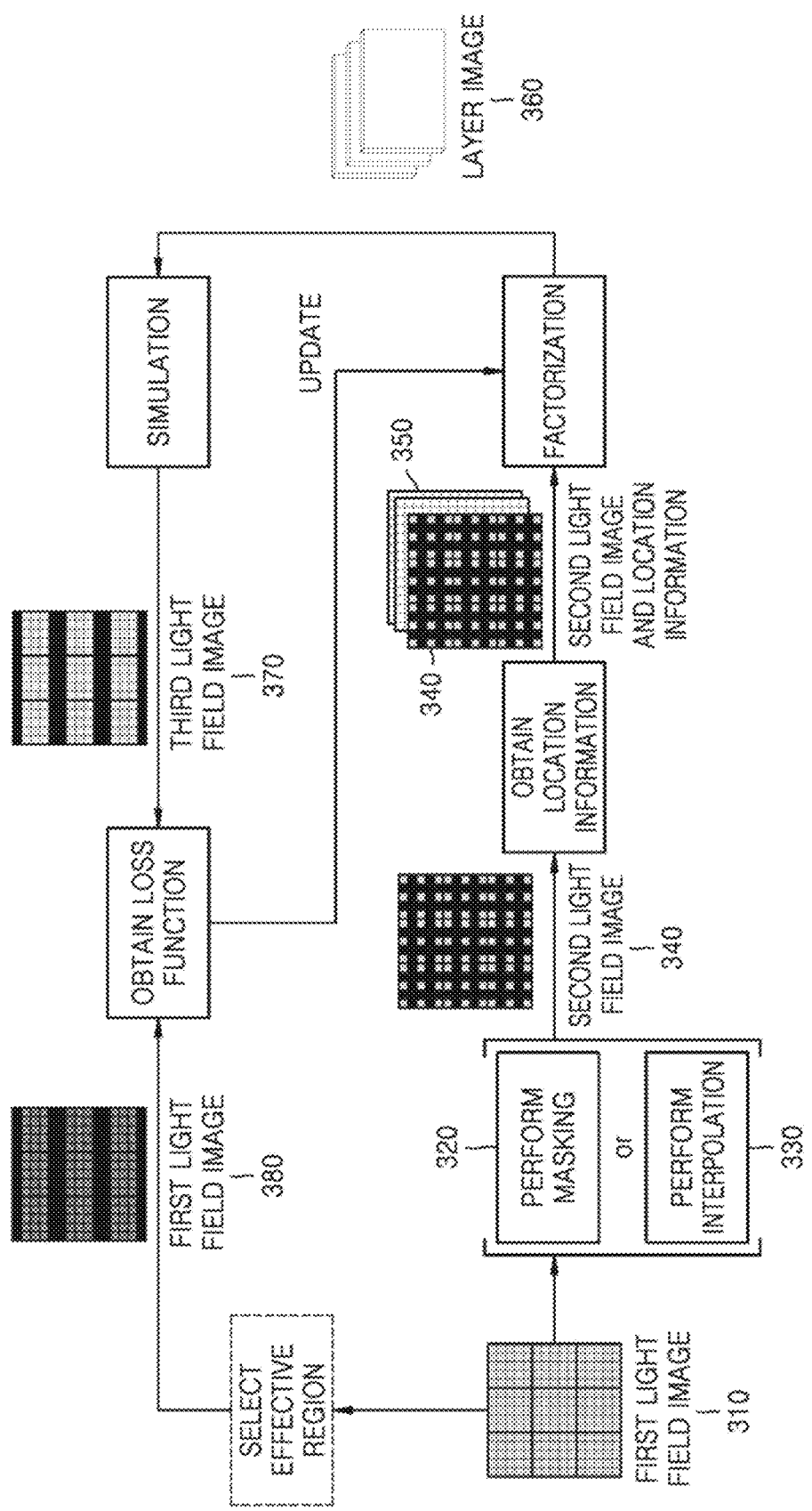
FIG. 3 is a diagram for describing a process of training an artificial intelligence model, which performs factorization, by an electronic device according to an embodiment of the disclosure.

FIG. 3 is a diagram for describing a process of training an artificial intelligence model, which performs factorization, by an electronic device 100 according to an embodiment of the disclosure.

According to an embodiment of the disclosure, the electronic device 100 may obtain a first light field image 310 with the first number of views. For example, when the electronic device 100 includes the light field camera, the electronic device 100 may obtain a first light field image 310 with 5×5 views having a resolution of 3×3 through the light field camera. When the electronic device 100 includes a transceiver, the electronic device 100 may receive the first light field image 310 with the 5×5 views having the resolution of 3×3 from an external light field camera or an external electronic device.

According to an embodiment of the disclosure, the number of views of the first light field image 310 may be understood to mean a maximum number of views that a display for rendering a layer image may express. In this case, the maximum number of views that the display may express may be determined by a viewing angle that the display may express. For example, when the maximum number of views that the display may express is 5×5, the number of views of the first light field image may be 5×5. However, the above description is intended to provide an example and thus embodiments of the disclosure are not limited thereto.

According to an embodiment of the disclosure, a disparity between the views of the first light field image 310 may be uniform. The uniform disparity between the views of the first light field image 310 may be understood to mean that disparities between adjacent views of the first light field image 310 have the same value.

A disparity between views may be defined as a difference between positions of pixels corresponding to the same object in neighboring views. When there are a plurality of objects in views, a disparity between the views may be understood to mean a largest absolute value among differences between positions of pixels corresponding to the plurality of objects.

According to an embodiment of the disclosure, the electronic device 100 may obtain a second light field image 340 including view images with a second number of views from the first light field image 310 including view images with the first number of views. The electronic device 100 may determine the second number of views, based on the number of input views and the number of output views of a scenario to be handled using an artificial intelligence model or the disparity between the views of the first light field image 310. For example, the electronic device 100 may obtain the second light field image 340 with the second number of views by performing masking 320 or interpolation 330 on the first light field image 310, based on the number of input views and the number of output views or the disparity between the views. However, a method of obtaining the second light field image 340 from the first light field image 310 by the electronic device 100 is not limited thereto.

In an embodiment of the disclosure, the electronic device 100 may determine the number of input views as the second number of views, based on the number of input views and the number of output views of the scenario to be handled using the artificial intelligence model, and obtain the second light field image 340 including view images with the number of input views from the first light field image 310. For example, when the number of input views and the number of output views of the scenario to be handled using the artificial intelligence model is the two-tuple (3×3, 3×5), the electronic device 100 may obtain the second light field image 340 including view images with 3×3 views by performing masking 320 or interpolation 330 on the first light field image 310.

FIG. 3 illustrates a case in which a disparity between the views of the first light field image 310 is uniform but according to an embodiment of the disclosure, the disparity between the views of the first light field image 310 may not be uniform. When the disparity between the views of the first light field image 310 is not uniform, the electronic device 100 may perform masking 320 on the first light field image 310 to obtain the second light field image 340 with the second number of views.

According to an embodiment of the disclosure, the electronic device 100 may obtain location information 350 corresponding to each of sub-pixels in the second light field image 340.

According to an embodiment of the disclosure, the electronic device 100 may obtain a layer image 360 by inputting the second light field image 340 and the location information 350 to an artificial intelligence model for performing factorization.

According to an embodiment of the disclosure, the electronic device 100 may obtain a third light field image 370 including view images with a third number of views by inputting the layer image 360 to a simulation model. In this case, the electronic device 100 may obtain the third light field image 370 including view images with the number of output views, based on the number of input views and the number of output views of the scenario to be handled using the artificial intelligence model. For example, when the number of input views and the number of output views of the scenario to be handled using the artificial intelligence model is the two-tuple (3×3, 3×5), the electronic device 100 may obtain the third light field image 370 with 3×5 views.

According to an embodiment of the disclosure, when the number of views of the first light field image 310 and the number of views of the third light field image 370 are different from each other, the electronic device 100 may select an effective region of the first light field image 310 such that the number of views of the first light field image 310 is the same as the number of views of the third light field image 370, and obtain a first light field image 380 including the effective region. For example, when the number of views of the first light field image 310 is 5×5 and the number of views of the third light field image 370 are 3×5, the electronic device 100 may select a 3×5 effective region of the first light field image 310 to obtain the first light field image 380. Thereafter, the electronic device 100 may train the artificial intelligence model, based on a result of comparing the first light field image 380 and the third light field image 370. Although FIG. 3 illustrates that the electronic device 100 selects the effective region of the first light field image 310 before a loss function is obtained, the electronic device 100 may obtain the effective region of the first light field image 310 during the obtaining of the loss function, and embodiments of the disclosure are not limited thereto.

According to an embodiment of the disclosure, the electronic device 100 may train the artificial intelligence model, based on the result of comparing the first light field image 380 and the third light field image 370 with each other. For example, the electronic device 100 may obtain a loss function by comparing the first light field image 380 and the third light field image 370 with each other, and train the artificial intelligence model by calculating a loss, based on the loss function. Thus, a result from the loss function of FIG. 3 is provided to the artificial intelligence model which computes the factorization of FIG. 3. As an example of this connection, see the path "UPDATE" in FIG. 11. In this case, the loss function may refer to an index indicating a current training state of the artificial intelligence model. That is, the loss function is an index indicating a degree of degradation of current performance of the artificial intelligence model, and the electronic device 100 may update the artificial intelligence model such that the loss function decreases. The artificial intelligence model may be trained with an operation of obtaining the layer image 360 from the second light field image 340 to reduce a loss function between the first light field image 380 and the third light field image 370. Thus, the electronic device 100 may train the artificial intelligence model to generate the layer image 360 from the second light field image 340.

Figure 4A:
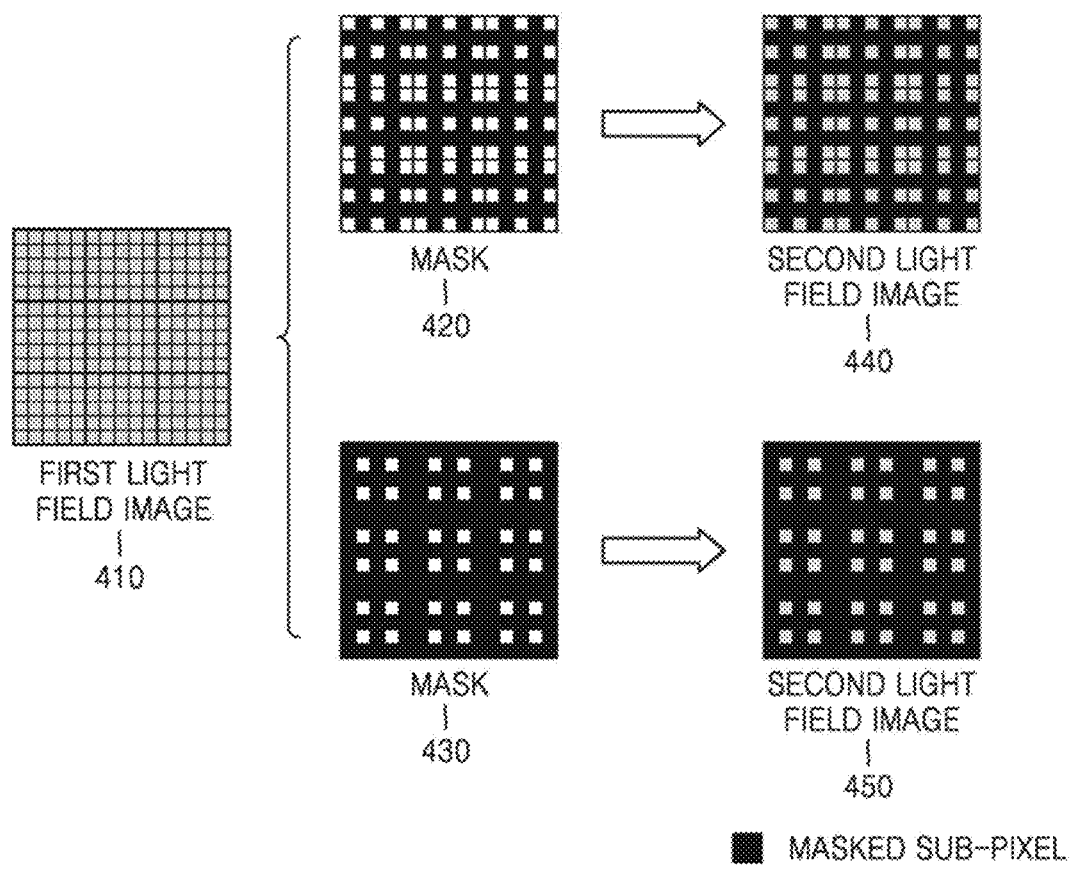
FIG. 4A is a diagram for describing a process of performing masking or interpolation on a light field image by an electronic device according to an embodiment of the disclosure.
Figure 4B:
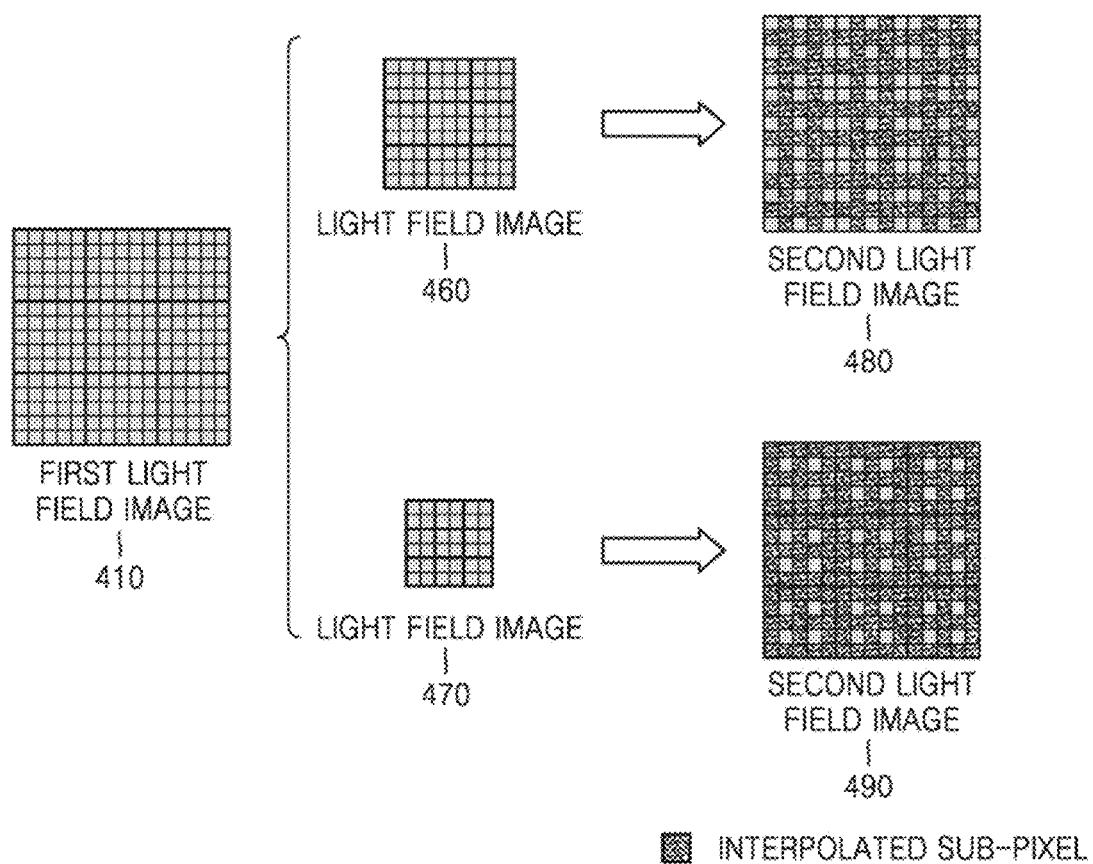
FIG. 4B is a diagram for describing a process of performing masking or interpolation on a light field image by an electronic device according to an embodiment of the disclosure.

FIG. 4A is diagram for describing a process of performing masking or interpolation on a light field image by an electronic device 100 according to an embodiment of the disclosure. FIG. 4B is diagram for describing a process of performing masking or interpolation on a light field image by an electronic device 100 according to an embodiment of the disclosure.

Referring to FIG. 4A, according to an embodiment of the disclosure, the electronic device 100 may perform masking on a first light field image 410 to obtain second light field images 440 and 450. For example, the electronic device 100 may determine a second number of views, based on the number of input views and the number of output views of a scenario to be handled using an artificial intelligence model or a disparity between views of the first light field image 410, and perform masking on the first light field image 410 to obtain the second light field images 440 and 450 each including view images with the second number of views.

In an embodiment of the disclosure, the electronic device 100 may determine the second number of views, based on the number of input views and the number of output views of the scenario to be handled using the artificial intelligence model or the disparity between the views of the first light field image 410, and generates masks 420 and 430 according to the determined second number of views. For example, the electronic device 100 may generate the mask 420 when the determined second number of views is 3×3, and generate the mask 430 when the determined second number of views is 2×2.

According to an embodiment of the disclosure, based on the generated masks 420 and 430, the electronic device 100 may perform masking on the first light field image 410 to obtain the second light field images 440 and 450 each including the view images with the second number of views. For example, based on the mask 420, the electronic device 100 may perform masking on the first light field image 410 to obtain the second light field image 440 including view images with 3×3 views. Alternatively, based on the mask 430, the electronic device 100 may perform masking on the first light field image 410 to obtain the second light field image 450 including view images with 2×2 views.

As masking is performed on the first light field image 410 to obtain the second light field images 440 and 450, the number of views of each of the second light field images 440 and 450 may be different from the number of views of the first light field image 410 but a format of the second light field images 440 and 450 may be the same as a format of the first light field image 410. For example, because masked sub-pixels in each of the second light field images 440 and 450 have a value of 0, the number of views of each of the second light field images 440 and 450 may be 3×3 or 2×2 and thus may be different from the number of the views, i.e., 5×5, of the first light field image 410. However, the format of the second light field images 440 and 450 may be 5×5 and thus may be the same as the format of the first light field image 410.

Referring to FIG. 4B, according to an embodiment of the disclosure, the electronic device 100 may perform interpolation on the first light field image 410 to obtain second light field images 480 and 490. For example, the electronic device 100 may determine the second number of views, based on the number of input views and the number of output views of the scenario to be handled using the artificial intelligence model or the disparity between the views of the first light field image 410, and perform interpolation on the first light field image 410 to obtain the second light field images 480 and 490 including view images with the second number of views. In this case, the electronic device 100 may perform epipolar plane image (EPI) interpolation to obtain the second light field images 480 and 490 but embodiments of the disclosure are not limited thereto.

In an embodiment of the disclosure, the electronic device 100 may determine the second number of views, based on the number of input views and the number of output views of the scenario to be handled using the artificial intelligence model or the disparity between the views of the first light field image 410, and perform sub-sampling on the first light field image 410 according to the determined second number of views. The sub-sampling provides a sub-sampled image. For example, when the determined second number of views is 3×3, the electronic device 100 may perform sub-sampling on the first light field image 410 to obtain a light field image 460 including view images with 3×3 views. When the determined second number of views is 2×2, the electronic device 100 may perform sub-sampling on the first light field image 410 to obtain a light field image 470 including view images with 2×2 views.

According to an embodiment of the disclosure, the electronic device 100 may perform interpolation on the light field images 460 and 470, which are obtained by sub-sampling, to obtain the second light field images 480 and 490. For example, the electronic device 100 may obtain the second light field image 480 by performing interpolation on the light field image 460 with 3×3 views. Alternatively, the electronic device 100 may obtain the second light field image 490 by performing interpolation on the light field image 470 with 2×2 views.

As the second light field images 480 and 490 are obtained by performing interpolation on the light field images 460 and 470, which are obtained by performing sub-sampling on the first light field image 410, the number of views of each of the second light field images 480 and 490 may be different from the number of the views of the first light field image 410 but a format of each of the second light field images 480 and 490 may be the same as a format of the first light field image 410. For example, the number of views of each of the light field images 460 and 470 obtained by performing sub-sampling on the first light field image 410 may be 3×3 or 2×2 and thus may be different from the number of views, i.e., 5×5, of the first light field image 410. However, a format of each of the second light field images 480 and 490 obtained by performing interpolation on the light field images 460 and 470 may be 5×2 and thus may be the same as the format of the first write field image 410 to 5×5. In this case, interpolated sub-pixel values of the second light field images 480 and 490 are values estimated from neighboring sub-pixels and do not affect the number of views of each of the second light field images 480 and 490.

Figure 5A:
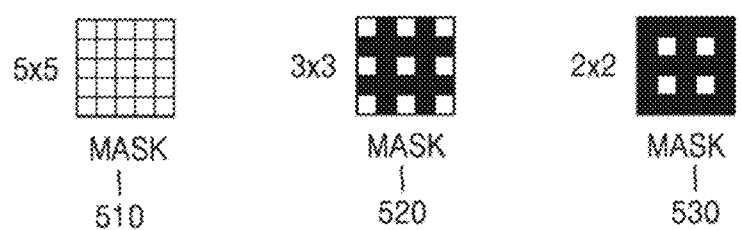
FIG. 5A is a diagram for describing a process of performing masking on a light field image by an electronic device according to an embodiment of the disclosure.
Figure 5C:
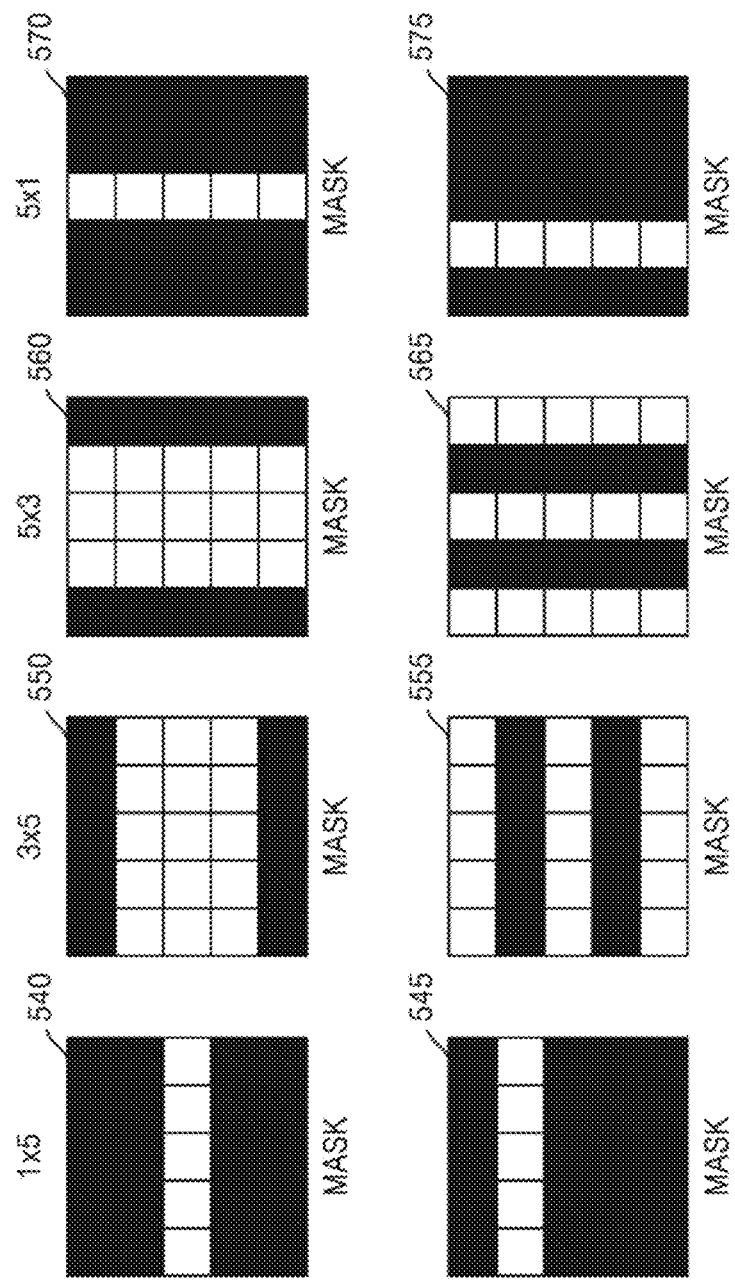
FIG. 5C is a diagram for describing a process of performing masking on a light field image by an electronic device according to an embodiment of the disclosure.

FIG. 5A is diagram for describing a process of performing masking on a light field image by the electronic device 100 according to an embodiment of the disclosure. FIG. 5B is diagram for describing a process of performing masking on a light field image by the electronic device 100 according to an embodiment of the disclosure. FIG. 5C is diagram for describing a process of performing masking on a light field image by the electronic device 100 according to an embodiment of the disclosure.

According to an embodiment of the disclosure, the electronic device 100 may determine the number of views of a second light field image according to the number of input views and the number of output views of a scenario to be handled using an artificial intelligence model and generate a mask according to the determined number of views. For example, when the number of input views of the scenario to be handled using the artificial intelligence model is 5×5, the electronic device 100 may generate a mask 510. Alternatively, when the number of input views of the scenario to be handled using the artificial intelligence model is 3×3, the electronic device 100 may generate a mask 520. When the number of input views of the scenario to be handled using the artificial intelligence model is 2×2, the electronic device 100 may generate a mask 530.

In this case, the scenario to be handled using the artificial intelligence model may be determined according to use of a display for rendering a layer image. For example, the number of input views and the number of output views of the scenario may be determined according to whether the display for rendering the layer image is included in a smartphone to be used for an individual or is included in an electric sign to be used for a great number of people. Therefore, the number of input views and the number of output views of the scenario to be handled using the artificial intelligence model may be defined beforehand or changed according to a user input but embodiments are not limited thereto.

According to an embodiment of the disclosure, the electronic device 100 may obtain a second light field image with the second number of views by performing masking on a first light field image, based on a generated mask. For example, the electronic device 100 may obtain a second light field image 515 with 5×5 views by performing masking on the first light field image, based on the mask 510. Alternatively, the electronic device 100 may obtain a second light field image 525 including view images with 3×3 views by performing masking on the first light field image, based on the mask 520. The electronic device 100 may obtain a second light field image 535 including view images with 2×2 views by performing masking on the first light field image, based on the mask 530.

FIG. 5C illustrates an example of a mask generated based on the number of input views of a scenario to be handled using an artificial intelligence model. In this case, the electronic device 100 may generate various types of masks, based on the same number of input views.

For example, the electronic device 100 may generate different types of masks such as a mask 540 and a mask 545 when the number of input views of the scenario to be handled using the artificial intelligence model is 1×5, and generate different types of masks such as a mask 550 and a mask 550 when the number of input views of the scenario to be handled using the artificial intelligence model is 3×5. The electronic device 100 may generate different types of masks such as a mask 560 and a mask 565 when the number of input views of the scenario to be handled using the artificial intelligence model is 5×3, and generate different types of masks such as a mask 570 and a mask 570 when the number of input views of the scenario to be handled using the artificial intelligence model is 5×1.

A form of a mask to be generated by the electronic device 100 according to the same number of input views may be defined beforehand according to a user's position and the like in the scenario or be changed according to a user input, but embodiments of the disclosure are not limited thereto.

Figure 6B:
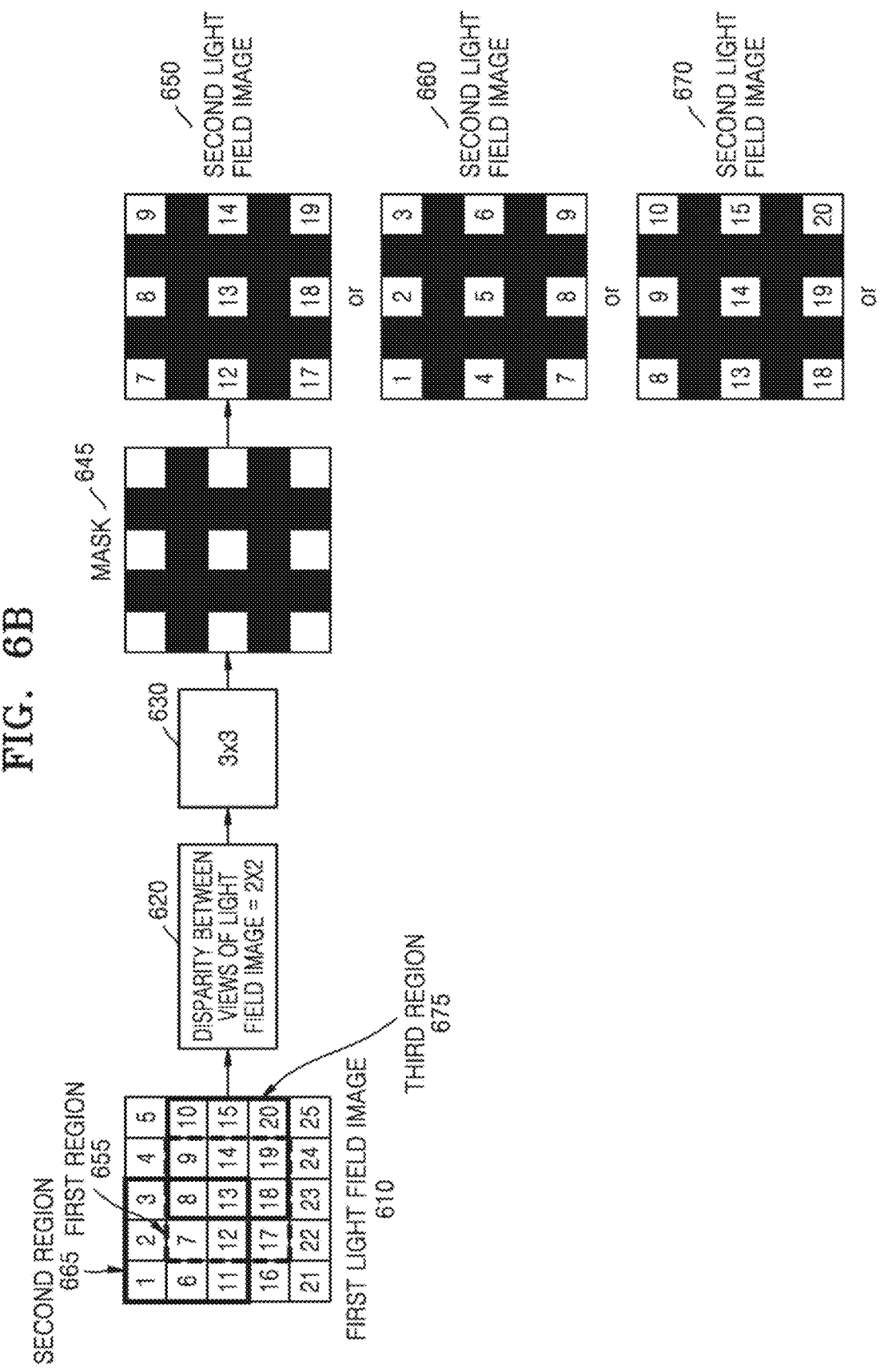
FIG. 6B is a diagram for describing a process of performing masking on a light field image by an electronic device according to an embodiment of the disclosure.

FIG. 6A is diagram for describing a process of performing masking on a light field image by the electronic device 100 according to an embodiment of the disclosure. FIG. 6B is diagram for describing a process of performing masking on a light field image by the electronic device 100 according to an embodiment of the disclosure.

According to an embodiment of the disclosure, the electronic device 100 may identify a disparity between views of a first light field image 610 and a disparity between views that may be expressed on a display (620) and determine the number of views, based on the disparities (630). For example, the electronic device 100 may identify that the disparity between the views of the first light field image 610 is 4 and the disparity between the views that may be expressed by the display is 2. When a training rule that a disparity between views of a light field image input to an artificial intelligence model should be the same as a disparity between views that may be expressed by a display is observed, the electronic device 100 may reduce the disparity between the views of the first light field image 610 to 2 by arranging pixels of the first light field image 610 to be separated by one space from each other. To arrange the pixels of the first light field image 610 to be separated by one space from each other, the electronic device 100 may determine the number of views of each of second light field images 650, 660, and 670 to be 3×3.

According to an embodiment of the disclosure, the electronic device 100 may generate a mask 640 according to the determined number of views. For example, when the determined number of views is 3×3, the electronic device 100 may generate a mask 645.

According to an embodiment of the disclosure, the electronic device 100 may obtain the second light field images 650, 660 and 670 by performing masking on the first light field image 610, based on a generated mask. For example, the electronic device 100 may obtain the second light field images 650, 660 and 670 each including view images with 3×3 views, based on the mask 645.

In this case, sub-pixels included in the second light field images 650, 660 and 670 obtained by performing masking may be defined beforehand or changed based on a user input. For example, the second light field image 650 may include sub-pixels included in a first region 655 having a size of 3×3 of the first light field image 610. The second light field image 660 may include sub-pixels included in a second region 665 having a size of 3×3 of the first light field image 610. The second light field image 670 may include sub-pixels included in a third region 675 having a size of 3×3 of the first light field image 610. However, the above description is intended to provide examples and thus embodiments of the disclosure are not limited thereto.

FIG. 7 is a diagram for describing a process of performing interpolation on a light field image by an electronic device 100 according to an embodiment of the disclosure.

According to an embodiment of the disclosure, the electronic device 100 may determine the number of views of a second light field image according to the number of input views and the number of output views of a scenario to be handled using an artificial intelligence model and perform sub-sampling on a first light field image 720 according to the determined number of views. For example, when the number of input views of the scenario to be handled using the artificial intelligence model is 3×3, the electronic device 100 may determine the number of views of the second light field image to be 3×3 and perform sub-sampling on the first light field image 720 to obtain a light field image 740 including view images with 3×3 views.

According to an embodiment of the disclosure, the electronic device 100 may identify a disparity between views of the first light field image 720 and a disparity between views that may be expressed on a display, and determine the number of views, based on the disparities. For example, the electronic device 100 may identify that the disparity between the views of the first light field image 720 is 2 and the disparity between the views that may be expressed by the display is 1. When the training rule that a disparity between views of a light field image input to an artificial intelligence model should be the same as a disparity between views that may be expressed by a display is observed, the electronic device 100 may reduce the disparity between the views of the first light field image 720 to 1 by arranging pixels of the first light field image 720 to be separated by one space from each other. To arrange the pixels of the first light field image 720 to be separated by one space from each other, the electronic device 100 may determine the number of views of a second light field image 760 to be 3×3.

Thereafter, the electronic device 100 may obtain the light field image 740 by performing sub-sampling on the first light field image 720 according to the determined number of views. For example, when the determined number of views is 3×3, the electronic device 100 may perform sub-sampling on the first light field image 720 to obtain the light field image 740 with 3×3 views.

According to an embodiment of the disclosure, the electronic device 100 may perform interpolation on the light field image 740, which is obtained by sub-sampling, to obtain the second light field image 760. For example, the electronic device 100 may obtain the second light field image 760 with 3×3 views by performing interpolation on the light field image 740 with 3×3 views.

Figure 8A:
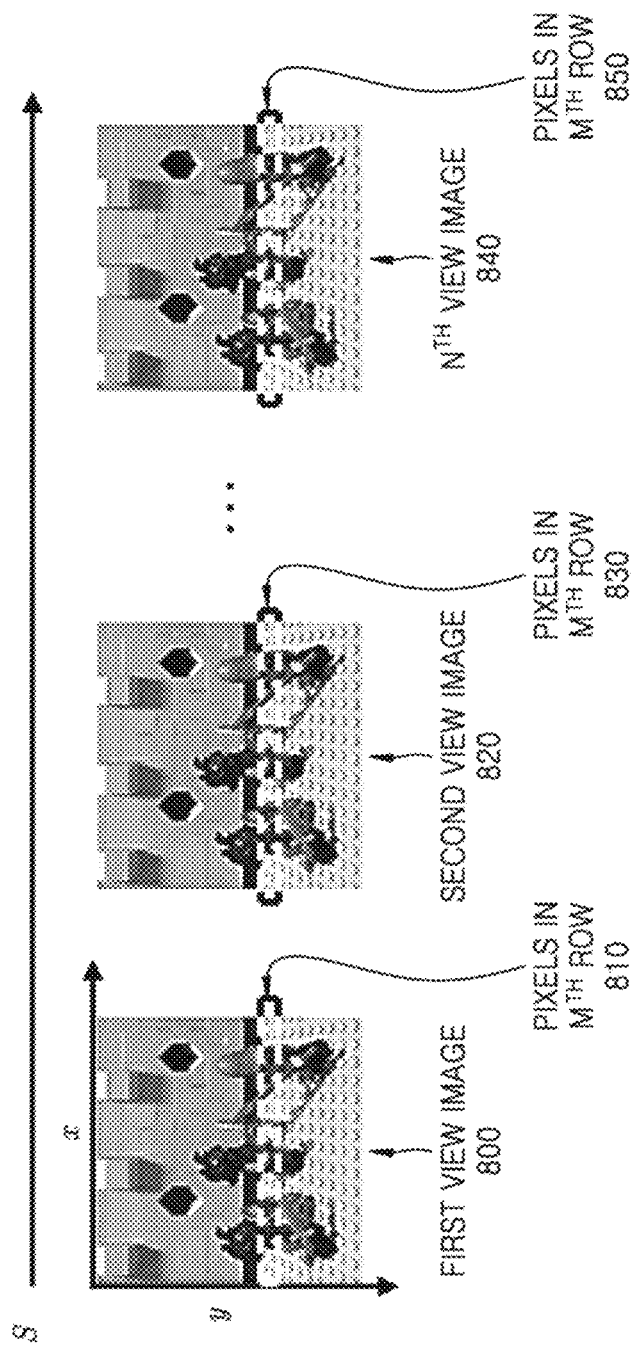
FIG. 8A is a diagram for describing a process of performing interpolation on a light field image by an electronic device according to an embodiment of the disclosure.
Figure 8B:
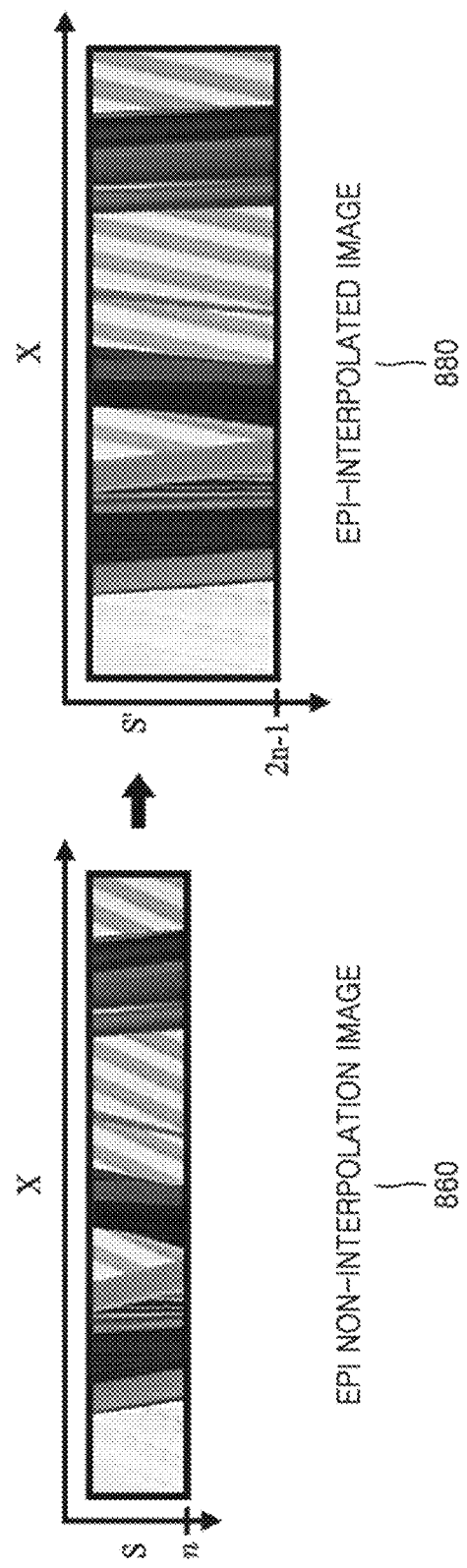
FIG. 8B is a diagram for describing a process of performing interpolation on a light field image by an electronic device according to an embodiment of the disclosure.

FIG. 8A is diagram for describing a process of performing interpolation on a light field image by the electronic device 100 according to an embodiment of the disclosure. FIG. 8B is diagram for describing a process of performing interpolation on a light field image by the electronic device 100 according to an embodiment of the disclosure.

Referring to FIG. 8A, according to an embodiment of the disclosure, the electronic device 100 may perform epipolar plane image (EPI) interpolation on a light field image. To perform EPI interpolation, the electronic device 100 may identify pixels included in a certain row in each view image. For example, when a light field image includes n view images, the electronic device 100 may identify pixels 810 included in an $m^{th}$ row in a first view image 800. In addition, the electronic device 100 may identify pixels 830 included in an $m^{th}$ row in a second view image 820 and pixels 850 included in an $m^{th}$ row in an $n^{th}$ view image 840.

Referring to FIG. 8B, the electronic device 100 may obtain an EPI non-interpolated image 860 by stacking pixels included in a certain column in each of view images according to an order of the view images. For example, the electronic device 100 may obtain the EPI non-interpolated image 860 by stacking n sets of pixels included in an $m^{th}$ row in each of the view images according to the order of the view images. In this case, the EPI non-interpolated image 860 may represent tendency of the movement of pixels corresponding to a certain object. For example, a large inclination formed by the pixels corresponding to the object may be understood to mean that a degree of movement according to views of the object is large, and a small inclination formed by the pixels may be understood to mean that the degree of movement according to the views of the object is small.

According to an embodiment of the disclosure, the electronic device 100 may perform EPI interpolation on the EPI non-interpolated image 860 to obtain an EPI-interpolated image 880. For example, in order to obtain a light field image with (2n−1) views from a light field image with n views, the electronic device 100 may perform EPI interpolation on the EPI non-interpolated image 860 to obtain the EPI-interpolated image 880 including (2n−1) sets of pixels. In this case, the electronic device 100 may add (n−1) sets of interpolated pixels between n sets of pixels included in the EPI non-interpolated image 860 to obtain the EPI-interpolated image 880 including the (2n−1) sets of pixels.

Although FIGS. 8A and 8B illustrate that the electronic device 100 identifies pixels included in a certain column in each view image of a light field image and performs interpolation, based on the pixels, the electronic device 100 may identify pixels included in a certain row in each view image of the light field image and perform interpolation, based on the pixels.

Figure 9:
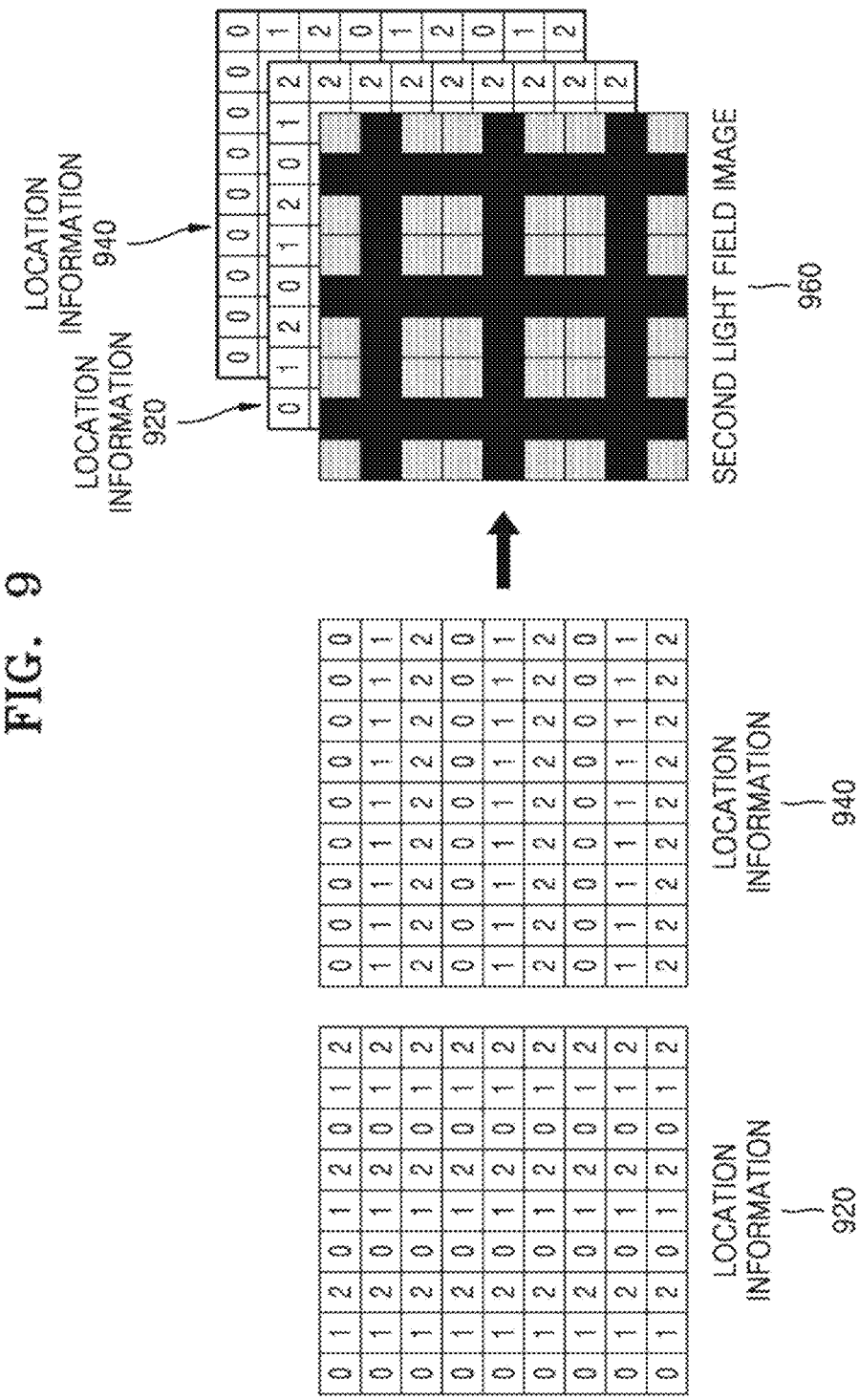
FIG. 9 is a diagram for describing a process of obtaining location information corresponding to each of sub-pixels in a light field image by an electronic device according to an embodiment of the disclosure.

FIG. 9 is a diagram for describing a process of obtaining location information corresponding to each of sub-pixels in a light field image by the electronic device 100 according to an embodiment of the disclosure.

According to an embodiment of the disclosure, the electronic device 100 may obtain location information corresponding to each of sub-pixels in a second light field image obtained from a first light field image. For example, when a second light field image 960 has a format of 3×3 and a resolution of 3×3, the electronic device 100 may obtain location information 920 including information about columns in which sub-pixels of a second light field image 960 are located. In addition, the electronic device 100 may obtain location information 940 including information about rows in which sub-pixels of the second light field 960 are located.

According to an embodiment of the disclosure, the electronic device 100 may obtain a layer image by inputting the second light field image 960 and the location information 920 and 940 to an artificial intelligence model for performing factorization. The electronic device 100 may input the location information 920 and 940 as well as the second light field image 960 to represent positions of masked or interpolated sub-pixels in the second light field image 960, thereby enhancing the performance of the artificial intelligence model.

Figure 10:
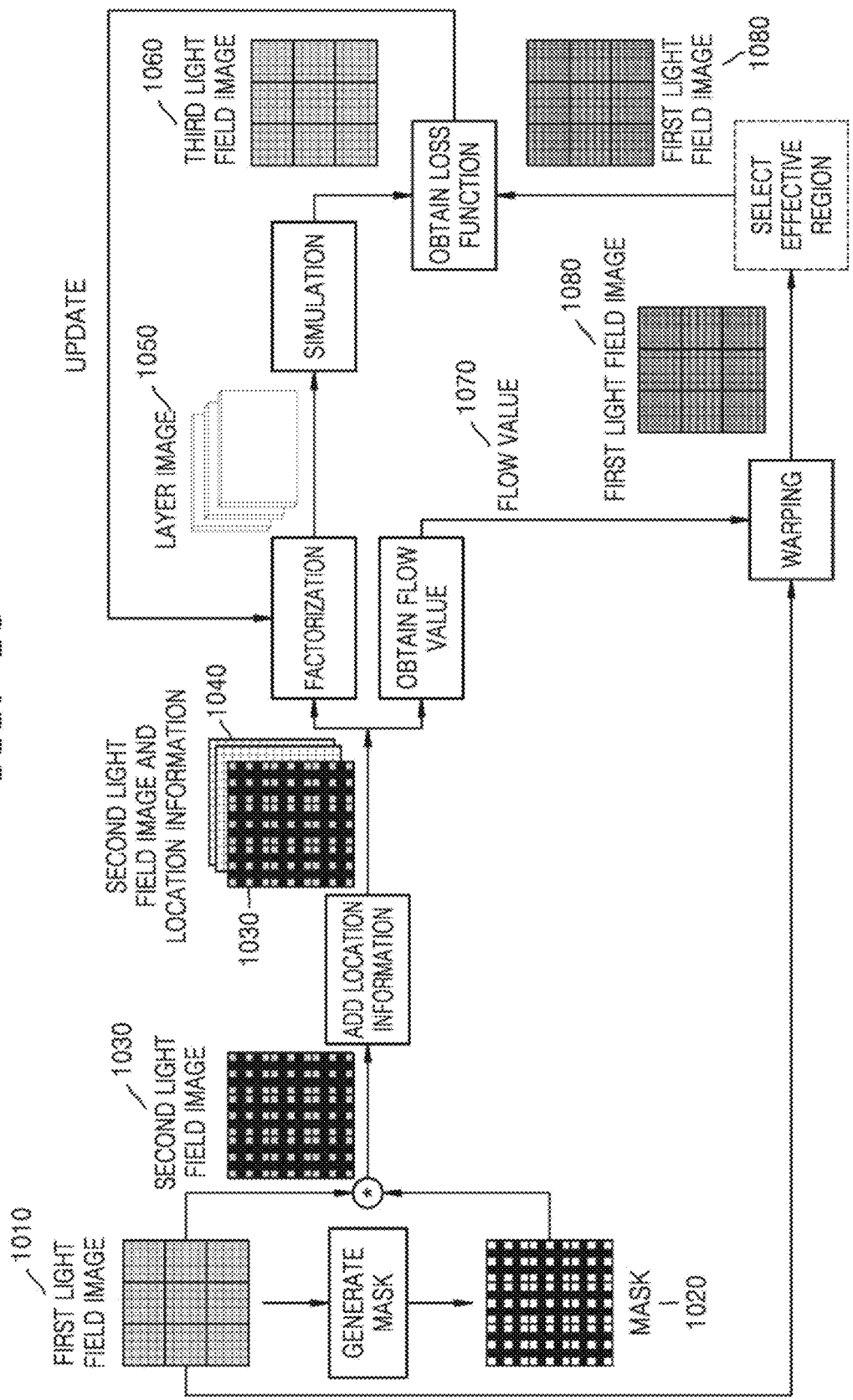
FIG. 10 is a diagram for describing a process of training an artificial intelligence model, which performs factorization, by an electronic device according to an embodiment of the disclosure.

FIG. 10 is a diagram for describing a process of training an artificial intelligence model, which performs factorization, by the electronic device 100 according to an embodiment of the disclosure.

According to an embodiment of the disclosure, a first light field image 1010 may include view images with a maximum number of views that may be expressed by a display for rendering a layer image. For example, when the maximum number of views that may be expressed by the display for rendering the layer image is 5×5, the first light field image 1010 may include view images with 5×5 views.

According to an embodiment of the disclosure, the first light field image 1010 may include view images with a resolution of the display for rendering the layer image. For example, when the resolution of the display for rendering the layer image is 3×3, the first light field image 1010 may include view images with the resolution of 3×3.

According to an embodiment of the disclosure, the electronic device 100 may obtain a second light field image 1030 including view images with a second number of views from the first light field image 1010 including view images with a first number of views. The electronic device 100 may determine the second number of views, based on the number of input views and the number of output views of a scenario to be handled using an artificial intelligence model or a disparity between views of the first light field image 1010, and perform masking on the first light field image 1010 to obtain the second light field image 1030 including view images with the second number of views.

For example, when the number of input views and the number of output views of the scenario to be handled using the artificial intelligence model is the two-tuple (3×3, 5×5), the electronic device 100 may determine the second number of views to be 3×3 and generate a mask 1020, based on the determined second number of views. The electronic device 100 may obtain the second light field image 1030 with 3×3 views by performing masking on the first light field image 1010, based on the generated mask 1020.

According to an embodiment of the disclosure, the electronic device 100 may obtain location information 1040 corresponding to each of sub-pixels in the second light field image 1030. For example, when the second light field image 1030 has a format of 5×5 and a resolution of 3×3, the electronic device 100 may obtain the location information 1040 corresponding to each of the sub-pixels in the second light field image 1030.

According to an embodiment of the disclosure, the electronic device 100 may obtain a layer image 1050 by inputting the second light field image 1030 and the location information 1040 to a first artificial intelligence model for performing factorization.

According to an embodiment of the disclosure, the electronic device 100 may obtain a third light field image 1060 with a third number of views by inputting the layer image 1050 to a simulation model. In this case, the electronic device 100 may obtain the third light field image 1060 with the number of output views, based on the number of input views and the number of output views of the scenario to be handled using the artificial intelligence model. For example, when the number of input views and the number of output views of the scenario to be handled using the artificial intelligence model is the two-tuple (3×3, 5×5), the electronic device 100 may obtain the third light field image 1060 with 5×5 views.

According to an embodiment of the disclosure, the electronic device 100 may obtain a flow value 1070 by inputting the second light field image 1030 and the location information 1040 to a second artificial intelligence model for obtaining a flow value. The flow value 1070 or a pixel movement value may be understood to mean a movement value of a pixel for changing a depth of a region of a light field image that is not within a depth range to prevent degradation of the quality of expressing the image quality, resolution or viewing angle of a region that is not within a depth range that may be expressed by a stacked display. That is, the flow value 1070 may be understood to mean a value for moving a pixel of a region of a light field image.

The second artificial intelligence model is an artificial intelligence model for obtaining a pixel movement value corresponding to the second light field image 1030 and may be a deep neural network (DNN)-based artificial intelligence model. However, the above description is intended to provide an example and thus embodiments of the disclosure are not limited thereto.

According to an embodiment of the disclosure, the electronic device 100 may obtain a first light field image 1080 by performing a warping technique on the first light field image 1010, based on the flow value 1070. The first light field image 1080 obtained by warping is distinct from the first light field image 1010 input to the warping function in FIG. 10. For example, the electronic device 100 may obtain the first light field image 1080 by moving pixels of view images included in the first light field image 1010 according to the flow value 1070.

Although FIG. 10 illustrates that the electronic device 100 obtains the flow value 1070 by inputting the second light field image 1030 and the location information 1040 to the second artificial intelligence model, the electronic device 100 may obtain the flow value 1070 by inputting the first light field image 1010 to the second artificial intelligence model.

According to an embodiment of the disclosure, when the number of views of the first light field image 1080 and the number of views of the third light field image 1060 are the same, the electronic device 100 may skip a process of selecting an effective region of the first light field image 1080. For example, when the number of views of the first light field image 1080 is 5×5 and the number of views of the third light field image 1060 is also 5×5, the electronic device 100 may skip the process of selecting an effective region of the first light field image 1080.

According to an embodiment of the disclosure, the electronic device 100 may train the first artificial intelligence model, based on a result of comparing the first light field image 1080 and the third light field image 1060 with each other. For example, the electronic device 100 may obtain a loss function by comparing the first light field image 1080 and the third light field image 1060 with each other, and train the first artificial intelligence model by calculating a loss, based on the loss function.

Although FIG. 10 illustrates that the electronic device 100 obtains the flow value 1070 and performs the warping technique based on the flow value 1070, the electronic device 100 may not obtain the flow value 1070 or perform the warping technique based on the flow value 1070. In this case, the electronic device 100 may train the first artificial intelligence model, based on the result of comparing the first light field image 1010 and the third light field image 1060 with each other.

Figure 11:
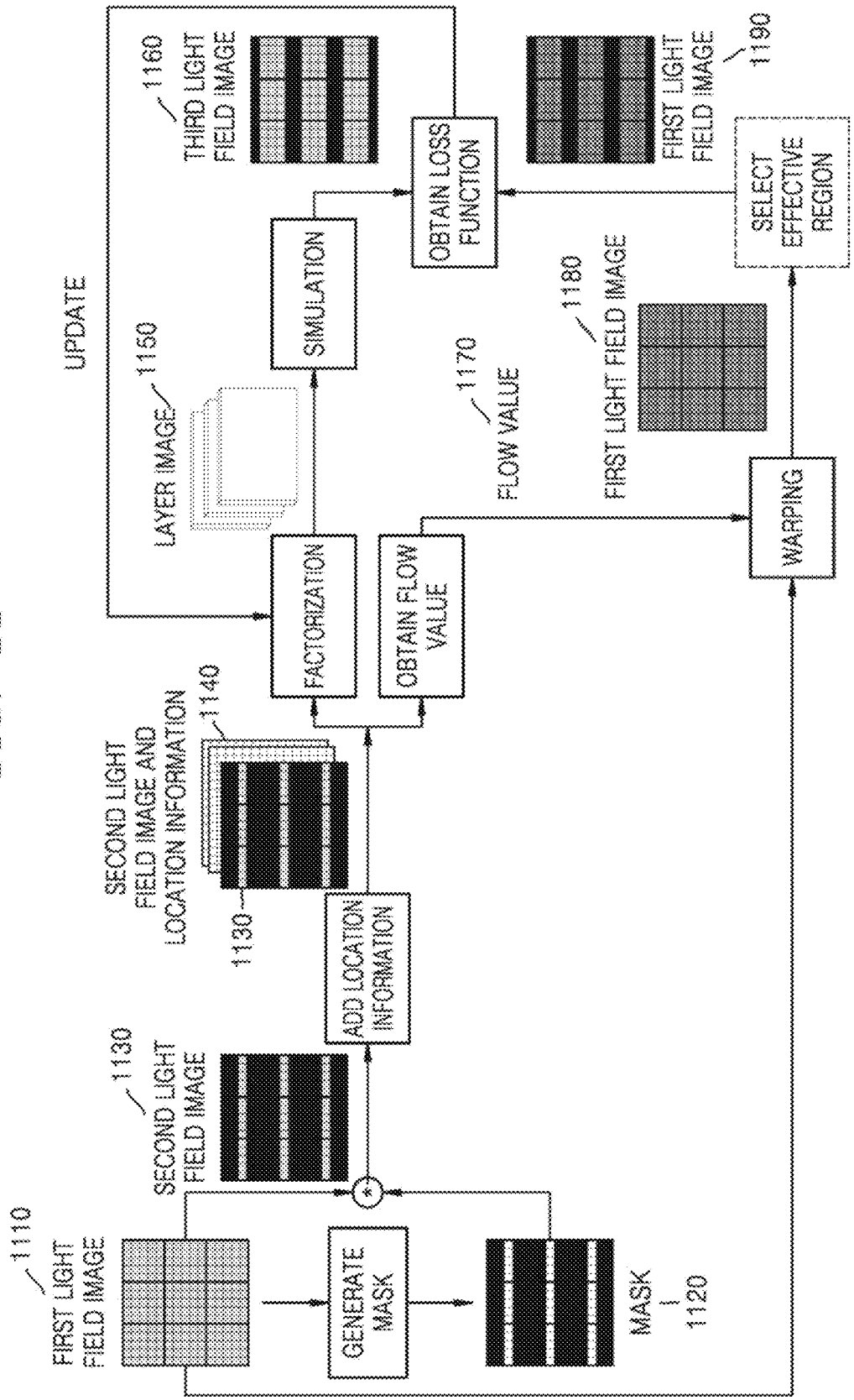
FIG. 11 is a diagram for describing a process of training an artificial intelligence model, which performs factorization, by an electronic device according to an embodiment of the disclosure.

FIG. 11 is a diagram for describing a process of training an artificial intelligence model, which performs factorization, by the electronic device 100 according to an embodiment of the disclosure. Operations that are the same as those described above with reference to FIG. 10 will be briefly described or a description thereof will be omitted herein.

According to an embodiment of the disclosure, a first light field image 1110 may include view images with a maximum number of views that may be expressed by a display for rendering a layer image. For example, when the maximum number of views that may be expressed by the display for rendering the layer image is 5×5, the first light field image 1110 may include view images with 5×5 views.

According to an embodiment of the disclosure, the first light field image 1110 may include view images with a resolution of the display for rendering the layer image. For example, when the resolution of the display for rendering the layer image is 3×3, the first light field image 1110 may include view images with the resolution of 3×3.

According to an embodiment of the disclosure, the electronic device 100 may obtain a second light field image 1130 including view images with a second number of views from the first light field image 1110 including view images with a first number of views. The electronic device 100 may determine the second number of views, based on the number of input views and the number of output views of a scenario to be handled using an artificial intelligence model or a disparity between views of the first light field image 1110, and perform masking on the first light field image 1110 to obtain the second light field image 1130 including view images with the second number of views.

For example, when the number of input views and the number of output views of the scenario to be handled using the artificial intelligence model is [1×5, 3×5], the electronic device 100 may determine the second number of views to be 1×5 and generate a mask 1120, based on the determined second number of views. The electronic device 100 may obtain a second light field image 1130 with 1×5 views by performing masking on the first light field image 1010, based on the generated mask 1120.

According to an embodiment of the disclosure, the electronic device 100 may obtain location information 1140 corresponding to each of sub-pixels in the second light field image 1130. For example, when the second light field image 1130 has a format of 5×5 and a resolution of 3×3, the electronic device 100 may obtain the location information 1140 corresponding to each of the sub-pixels in the second light field image 1130.

According to an embodiment of the disclosure, the electronic device 100 may obtain a layer image 1150 by inputting the second light field image 1130 and the location information 1140 to a first artificial intelligence model for performing factorization.

According to an embodiment of the disclosure, the electronic device 100 may obtain a third light field image 1160 with a third number of views by inputting the layer image 1150 to a simulation model. In this case, the electronic device 100 may obtain the third light field image 1160 with the number of output views, based on the number of input views and the number of output views of the scenario to be handled using the artificial intelligence model. For example, when the number of input views and the number of output views of the scenario to be handled using the artificial intelligence model is [1×5, 3×5], the electronic device 100 may obtain the third light field image 1160 with 3×5 views.

According to an embodiment of the disclosure, the electronic device 100 may obtain a flow value 1170 by inputting the second light field image 1130 and the location information 1140 to a second artificial intelligence model for obtaining a flow value.

According to an embodiment of the disclosure, the electronic device 100 may obtain a first light field image 1180 by performing the warping technique on the first light field image 1110, based on the flow value 1170. First light field image 1180 is in general distinct from first light field image 1110 of FIG. 11. Similar comments apply for the first light field image before and after warping in FIGS. 12-13. The electronic device 100 may obtain the first light field image 1180, as an example, by moving pixels of view images included in the first light field image 1110 according to the flow value 1170.

Although FIG. 11 illustrates that the electronic device 100 obtains the flow value 1170 by inputting the second light field image 1130 and the location information 1140 to the second artificial intelligence model, the electronic device 100 may obtain the flow value 1170 by inputting the first light field image 1110 to the second artificial intelligence model.

According to an embodiment of the disclosure, when the number of views of the first light field image 1180 and the number of views of the third light field image 1160 are different from each other, the electronic device 100 may obtain a first light field image 1190 by selecting an effective region of the first light field image 1180 such that the number of views of the first light field image 1180 and the number of views of the third light field image 1160 are the same. For example, when the number of views of the first light field image 1180 is 5×5 and the number of views of the third light field image 1160 are 3×5, the electronic device 100 may select a 3×5 effective region of the first light field image 1180 to obtain the first light field image 1190.

According to an embodiment of the disclosure, the electronic device 100 may train the first artificial intelligence model, based on a result of comparing the first light field image 1190 and the third light field image 1160 with each other. For example, the electronic device 100 may obtain a loss function by comparing the first light field image 1190 and the third light field image 1160 with each other, and train the first artificial intelligence model by calculating a loss, based on the loss function.

Although FIG. 11 illustrates that the electronic device 100 obtains the flow value 1170 and performs the warping technique based on the flow value 1170, the electronic device 100 may not obtain of the flow value 1170 or perform the warping technique based on the flow value 1170. In this case, the electronic device 100 may select an effective region of the first light field image 1110, and train the first artificial intelligence model, based on a result of comparing the first light field image 1110 from which the effective region is selected and the third light field image 1160 with each other.

Figure 12:
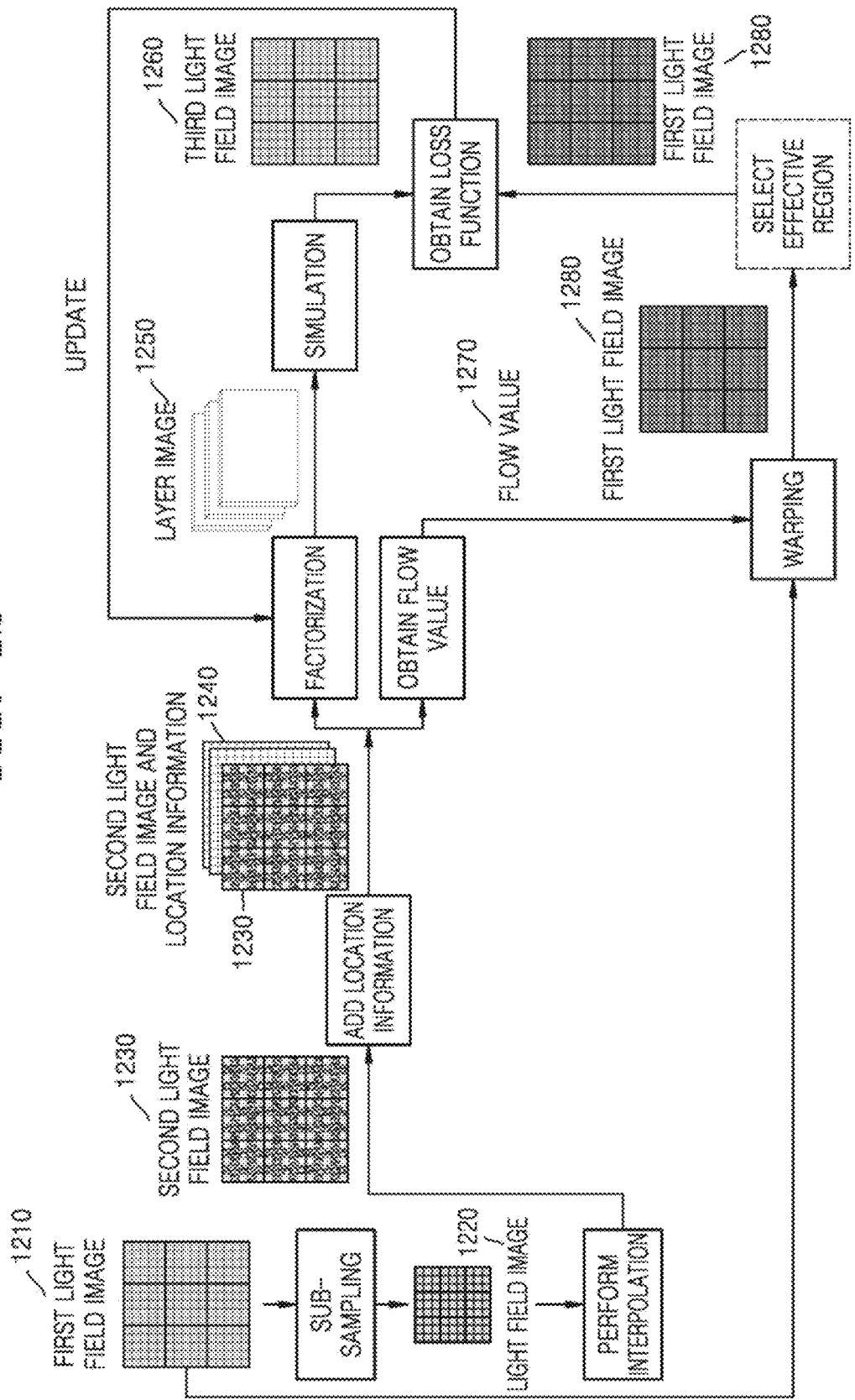
FIG. 12 is a diagram for describing a process of training an artificial intelligence model, which performs factorization, by an electronic device according to an embodiment of the disclosure.

FIG. 12 is a diagram for describing a process of training an artificial intelligence model, which performs factorization, by the electronic device 100 according to an embodiment of the disclosure. Operations that are the same as those described above with reference to FIG. 10 will be briefly described or a description thereof will be omitted herein.

According to an embodiment of the disclosure, a first light field image 1210 may include view images with a maximum number of views that may be expressed by a display for rendering a layer image. For example, when the maximum number of views that may be expressed by the display for rendering the layer image is 5×5, the first light field image 1210 may include view images with 5×5 views.

According to an embodiment of the disclosure, the first light field image 1210 may include view images with a resolution of the display for rendering the layer image. For example, when the resolution of the display for rendering the layer image is 3×3, the first light field image 1210 may include view images with the resolution of 3×3.

According to an embodiment of the disclosure, the electronic device 100 may obtain a second light field image 1230 including view images with a second number of views from the first light field image 1210 including view images with a first number of views. The electronic device 100 may determine the second number of views, based on the number of input views and the number of output views of a scenario to be handled using an artificial intelligence model or a disparity between views of the first light field image 1010, and perform interpolation on the first light field image 1010 to obtain the second light field image 1230 including view images with the second number of views.

For example, when the number of input views and the number of output views of the scenario to be handled using the artificial intelligence model is the two-tuple (3×3, 5×5), the electronic device 100 may obtain a light field image 1220 with 3×3 views by performing sub-sampling on the first light field image 1210. The electronic device 100 may obtain the second light field image 1230 with 3×3 views by performing interpolation on the light field image 1220 obtained by sub-sampling.

According to an embodiment of the disclosure, the electronic device 100 may obtain location information 1240 corresponding to each of sub-pixels in the second light field image 1230. For example, when the second light field image 1230 has a format of 5×5 and a resolution of 3×3, the electronic device 100 may obtain the location information 1240 corresponding to each of the sub-pixels in the second light field image 1230.

According to an embodiment of the disclosure, the electronic device 100 may obtain a layer image 1250 by inputting the second light field image 1230 and the location information 1240 to a first artificial intelligence model for performing factorization.

According to an embodiment of the disclosure, the electronic device 100 may obtain a third light field image 1260 with a third number of views by inputting the layer image 1150 to a simulation model. In this case, the electronic device 100 may obtain the third light field image 1260 with the number of output views, based on the number of input views and the number of output views of the scenario to be handled using the artificial intelligence model. For example, when the number of input views and the number of output views of the scenario to be handled using the artificial intelligence model is the two-tuple (3×3, 5×5), the electronic device 100 may obtain the third light field image 1260 with 5×5 views.

According to an embodiment of the disclosure, the electronic device 100 may obtain a flow value 1270 by inputting the second light field image 1230 and the location information 1240 to a second artificial intelligence model for obtaining a flow value.

According to an embodiment of the disclosure, the electronic device 100 may obtain a first light field image 1280 by performing the warping technique on the first light field image 1210, based on the flow value 1270. For example, the electronic device 100 may obtain the first light field image 1280 by moving pixels of view images included in the first light field image 1210 according to the flow value 1270.

Although FIG. 12 illustrates that the electronic device 100 obtains the flow value 1270 by inputting the second light field image 1230 and the location information 1240 to the second artificial intelligence model, the electronic device 100 may obtain the flow value 1270 by inputting the first light field image 1210 to the second artificial intelligence model.

According to an embodiment of the disclosure, when the number of views of the first light field image 1280 and the number of views of the third light field image 1260 are the same, the electronic device 100 may skip a process of selecting an effective region of the first light field image 1280. For example, when the number of views of the first light field image 1280 is 5×5 and the number of views of the third light field image 1260 is also 5×5, the electronic device 100 may skip the process of selecting an effective region of the first light field image 1280.

According to an embodiment of the disclosure, the electronic device 100 may train the first artificial intelligence model, based on a result of comparing the first light field image 1280 and the third light field image 1260 with each other. For example, the electronic device 100 may obtain a loss function by comparing the first light field image 1280 and the third light field image 1260 with each other, and train the first artificial intelligence model by calculating a loss, based on the loss function.

Although FIG. 12 illustrates that the electronic device 100 obtains the flow value 1270 and performs the warping technique based on the flow value 1270, the electronic device 100 may not obtain of the flow value 1270 or perform the warping technique based on the flow value 1270. In this case, the electronic device 100 may train the first artificial intelligence model, based on the result of comparing the first light field image 1210 and the third light field image 1260 with each other.

Figure 13:
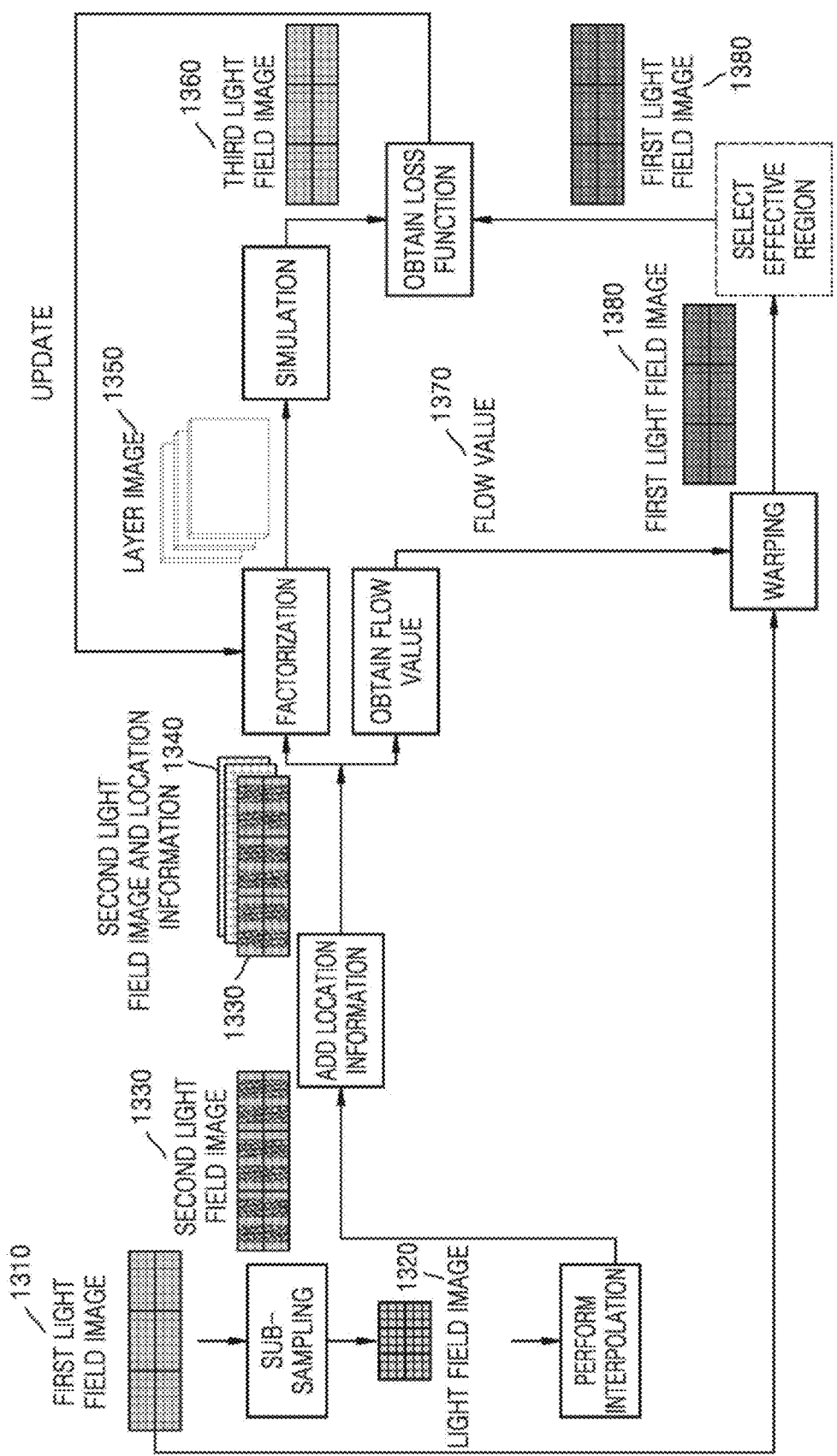
FIG. 13 is a diagram for describing a process of training an artificial intelligence model, which performs factorization, by an electronic device according to an embodiment of the disclosure.

FIG. 13 is a diagram for describing a process of training an artificial intelligence model, which performs factorization, by the electronic device 100 according to an embodiment of the disclosure. Operations that are the same as those described above with reference to FIG. 10 will be briefly described or a description thereof will be omitted herein.

According to an embodiment of the disclosure, a first light field image 1310 may include view images with a maximum number of views that may be expressed by a display for rendering a layer image. For example, when the maximum number of views that may be expressed by the display for rendering the layer image is 3×7, the first light field image 1310 may include 3×7 view images.

According to an embodiment of the disclosure, the first light field image 1310 may include view images with a resolution of the display for rendering the layer image. For example, when the resolution of the display for rendering the layer image is 3×2, the first light field image 1310 may include view images with the resolution of 3×2.

According to an embodiment of the disclosure, the electronic device 100 may obtain a second light field image 1330 including view images with a second number of views from the first light field image 1310 including view images with a first number of views. The electronic device 100 may determine the second number of views, based on the number of input views and the number of output views of a scenario to be handled using an artificial intelligence model or a disparity between views of the first light field image 1310, and perform interpolation on the first light field image 1310 to obtain the second light field image 1330 including view images with the second number of views.

For example, when the number of input views and the number of output views of the scenario to be handled using the artificial intelligence model is the two-tuple (3×3, 3×7), the electronic device 100 may obtain a light field image 1320 with 3×3 views by performing sub-sampling on the first light field image 1310. The electronic device 100 may obtain the second light field image 1330 with 3×3 views by performing interpolation on the light field image 1320 obtained by sub-sampling.

According to an embodiment of the disclosure, the electronic device 100 may obtain location information 1340 corresponding to each of sub-pixels in the second light field image 1330. For example, when the second light field image 1330 has a format of 3×7 and a resolution of 3×2, the electronic device 100 may obtain the location information 1340 corresponding to each of the sub-pixels in the second light field image 1330.

According to an embodiment of the disclosure, the electronic device 100 may obtain a layer image 1350 by inputting the second light field image 1330 and the location information 1340 to a first artificial intelligence model for performing factorization.

According to an embodiment of the disclosure, the electronic device 100 may obtain a third light field image 1360 with a third number of views by inputting the layer image 1350 to a simulation model. In this case, the electronic device 100 may obtain the third light field image 1360 with the number of output views, based on the number of input views and the number of output views of the scenario to be handled using the artificial intelligence model. For example, when the number of input views and the number of output views of the scenario to be handled using the artificial intelligence model is the two-tuple (3×3, 3×7), the electronic device 100 may obtain the third light field image 1360 with 3×7 views.

According to an embodiment of the disclosure, the electronic device 100 may obtain a flow value 1370 by inputting the second light field image 1330 and the location information 1340 to a second artificial intelligence model for obtaining a flow value.

According to an embodiment of the disclosure, the electronic device 100 may obtain a first light field image 1380 by performing the warping technique on the first light field image 1310, based on the flow value 1370. For example, the electronic device 100 may obtain the first light field image 1380 by moving pixels of view images included in the first light field image 1310 according to the flow value 1370.

Although FIG. 13 illustrates that the electronic device 100 obtains the flow value 1370 by inputting the second light field image 1330 and the location information 1340 to the second artificial intelligence model, the electronic device 100 may obtain the flow value 1370 by inputting the first light field image 1310 to the second artificial intelligence model.

According to an embodiment of the disclosure, when the number of views of the first light field image 1380 and the number of views of the third light field image 1360 are the same, the electronic device 100 may skip a process of selecting an effective region of the first light field image 1380. For example, when the number of views of the first light field image 1380 is 3×7 and the number of views of the third light field image 1360 is also 3×7, the electronic device 100 may skip the process of selecting an effective region of the first light field image 1380.

According to an embodiment of the disclosure, the electronic device 100 may train the first artificial intelligence model, based on a result of comparing the first light field image 1380 and the third light field image 1360 with each other. For example, the electronic device 100 may obtain a loss function by comparing the first light field image 1380 and the third light field image 1360 with each other, and train the first artificial intelligence model by calculating a loss, based on the loss function.

Although FIG. 13 illustrates that the electronic device 100 obtains the flow value 1370 and performs the warping technique based on the flow value 1370, the electronic device 100 may not obtain of the flow value 1370 or perform the warping technique based on the flow value 1370. In this case, the electronic device 100 may train the first artificial intelligence model, based on the result of comparing the first light field image 1310 and the third light field image 1360 with each other.

Figure 14:
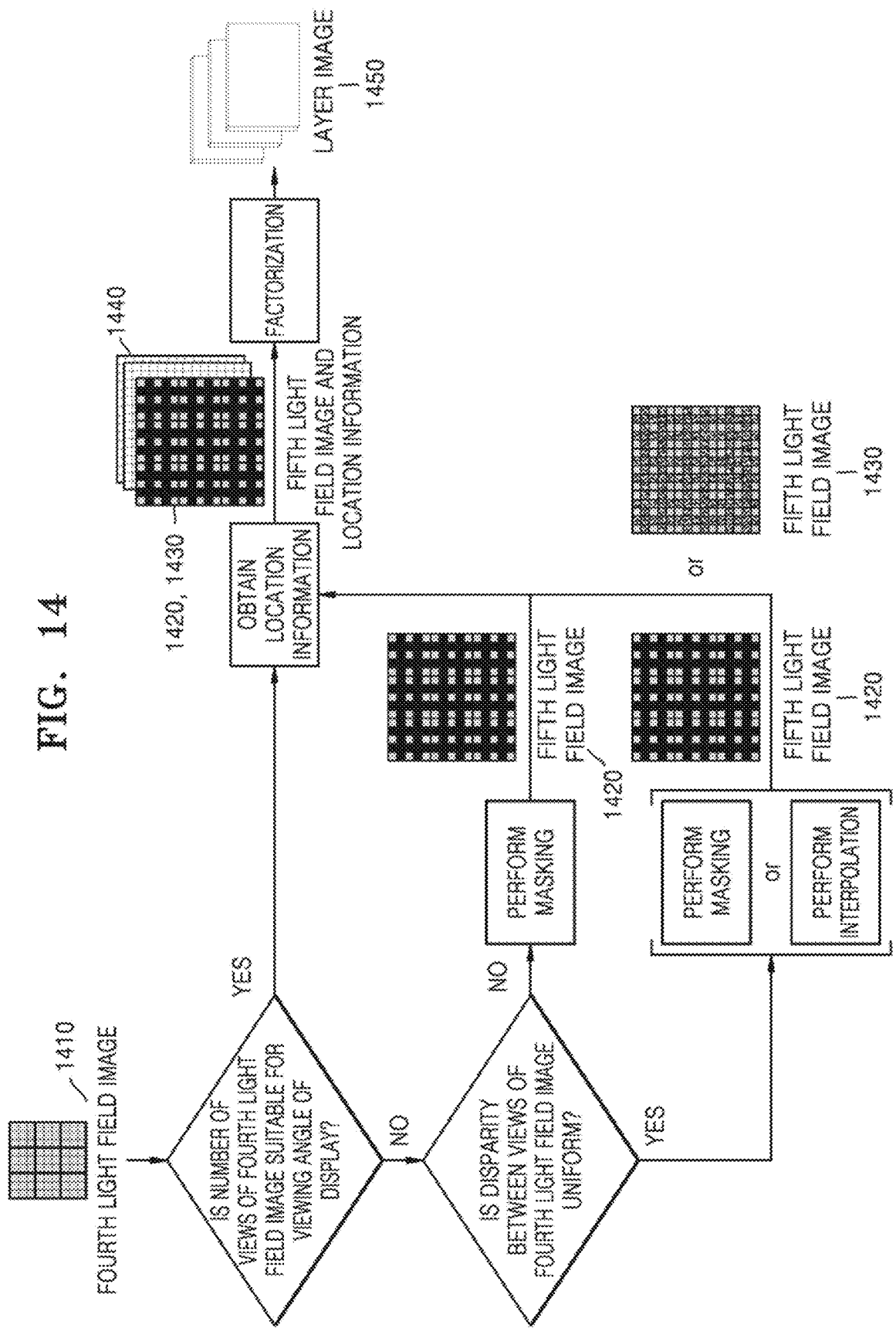
FIG. 14 is a diagram for describing a process of performing factorization using a trained artificial intelligence model by an electronic device according to an embodiment of the disclosure.

FIG. 14 is a diagram for describing a process of performing factorization using a trained artificial intelligence model by the electronic device 100 according to an embodiment of the disclosure.

According to an embodiment of the disclosure, the electronic device 100 may obtain a fourth light field image 1410 with a fourth number of views. For example, when the electronic device 100 includes a light field camera, the electronic device 100 may obtain the fourth light field image 1410 with 3×3 views having a resolution of 3×3 through the light field camera. When the electronic device 100 includes a transceiver, the electronic device 100 may receive the fourth light field image 1410 with the 3×3 views having the resolution of 3×3 from an external light field camera or an external electronic device.

According to an embodiment of the disclosure, the electronic device 100 may determine whether the number of views of the fourth light field image 1410 is suitable for a viewing angle of a display for rendering a layer image 1450. For example, the electronic device 100 may compare the number of views of the fourth light field image 1410 with the number of views corresponding to the viewing angle of the display for rendering the layer image 1450. In this case, the number of views corresponding to the viewing angle of the display may be determined such that image quality degradation may not occur within a fixed viewing distance or within a viewing distance greater than or equal to an approximate distance. However, the above description is intended to provide an example and thus embodiments of the disclosure are not limited thereto.

According to an embodiment of the disclosure, when the number of views of the fourth light field image 1410 is greater than or equal to the number of views corresponding to the viewing angle of the display for rendering the layer image 1450, the electronic device 100 may input the fourth light field image 1410 to a trained artificial intelligence model. When the number of views of the fourth light field image 1410 is less than the number of views corresponding to the viewing angle of the display for rendering the layer image 1450, the electronic device 100 may obtain fifth light field images 1420 and 1430 by changing a format of the fourth light field image 1410 and input the obtained fifth light field images 1420 and 1430 to the trained artificial intelligence model. As the fifth light field images 1420 and 1430 are obtained by changing the format of the fourth light field image 1410, the fifth light field images 1420 and 1430 may have a same number of formats as the number of views corresponding to the viewing angle of the display for rendering the layer image 1450.

According to an embodiment of the disclosure, when the number of views of the fourth light field image 1410 is not suitable for the viewing angle of the display for rendering the layer image 1450, the electronic device 100 may determine whether a display between the views of the fourth light field image 1410 is uniform and obtain the fifth light field images 1420 and 1430, based on a result of the determining. When the disparity between the views of the fourth light field image 1410 is not uniform, the electronic device 100 may perform masking on the fourth light field image 1410 to obtain the fifth light field image 1420. When the disparity between the views of the fourth light field image 1410 is uniform, the electronic device 100 may perform masking or interpolation on the fourth light field image 1410 to obtain the fifth light field images 1420 and 1430.

According to an embodiment of the disclosure, the electronic device 100 may obtain location information 1440 corresponding to each of sub-pixels in the fourth light field image 1410 or the fifth light field images 1420 and 1430. For example, when the fourth light field image 1410 or the fifth light field images 1420 and 1430 have a format of 5×5 and a resolution of 3×3, the electronic device 100 may obtain the location information 1440 corresponding to each of the sub-pixels in the fourth light field image 1410 or the fifth light field images 1420 and 1430.

According to an embodiment of the disclosure, the electronic device 100 may obtain the layer image 1450 by inputting either the fourth light field image 1410 or the fifth light field images 1420, and 1430 and the location information 1440 to a trained artificial intelligence model.

According to an embodiment of the disclosure, the layer image 1450 may be rendered on the display. For example, when the electronic device 100 includes a display, the electronic device 100 may render the layer image 1450 on the display. When the electronic device includes a transceiver, the electronic device 100 may transmit the layer image 1450 to an external electronic device, which includes a display, through the transceiver, and the layer image 1450 may be rendered on the display by the external electronic device.

Figure 15:
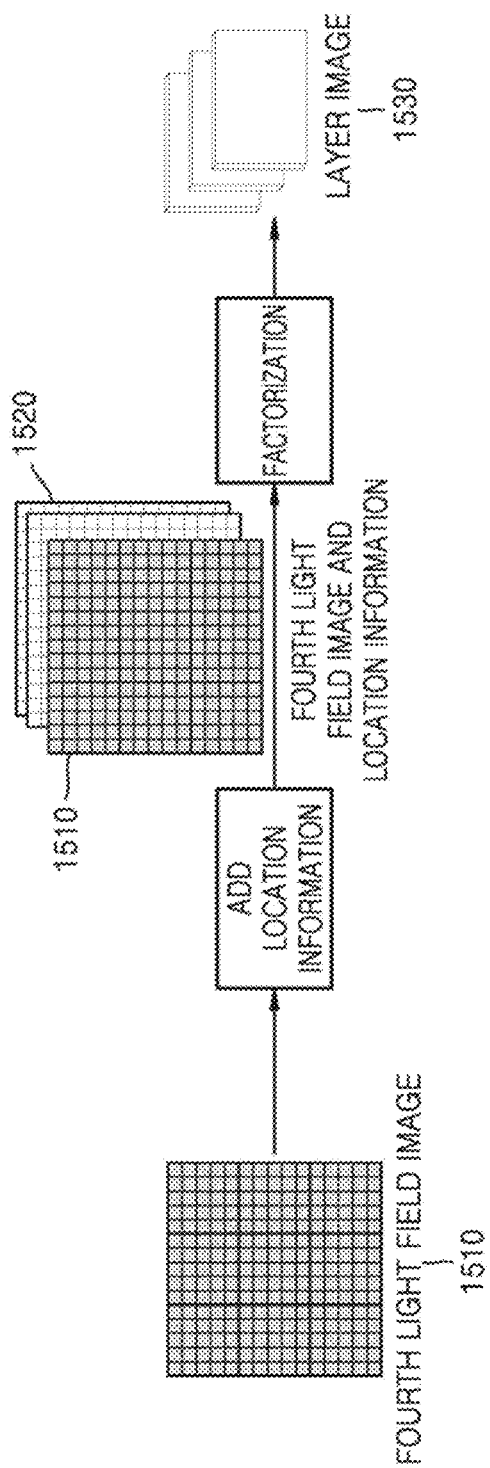
FIG. 15 is a diagram for describing a process of performing factorization using a trained artificial intelligence model by an electronic device according to an embodiment of the disclosure.

FIG. 15 is a diagram for describing a process of performing factorization using a trained artificial intelligence model by the electronic device 100 according to an embodiment of the disclosure.

According to an embodiment of the disclosure, the electronic device 100 may obtain a fifth light field image 1510 with a fourth number of views. For example, the electronic device 100 may receive the fourth light field image 1510 with 5×5 views having a resolution of 3×3.

According to an embodiment of the disclosure, the electronic device 100 may determine whether the number of views of the fourth light field image 1510 is suitable for a viewing angle of a display for rendering a layer image 1530. For example, when the number of views corresponding to the viewing angle of the display is 5×5, the number of views of the fourth light field image 1510 is the same as the number of views corresponding to the viewing angle of the display and thus the electronic device 100 may determine that the number of views of the fourth light field image 1510 is suitable for the viewing angle of the display for rendering the layer image 1530.

According to an embodiment of the disclosure, when the number of views of the fourth light field image 1510 is suitable for the viewing angle of the display for rendering the display image 1530, the electronic device 100 may obtain location information 1520 corresponding to each of sub-pixels in the fourth light field image 1510. For example, when the fourth light field image 1510 has a format of 5×5 and a resolution of 3×3, the electronic device 100 may obtain the location information 1520 corresponding to each of the sub-pixels in the fourth light field image 1510.

According to an embodiment of the disclosure, the electronic device 100 may obtain the layer image 1530 by inputting the fourth light field image 1510 and the location information 1520 to a trained artificial intelligence model.

Figure 16:
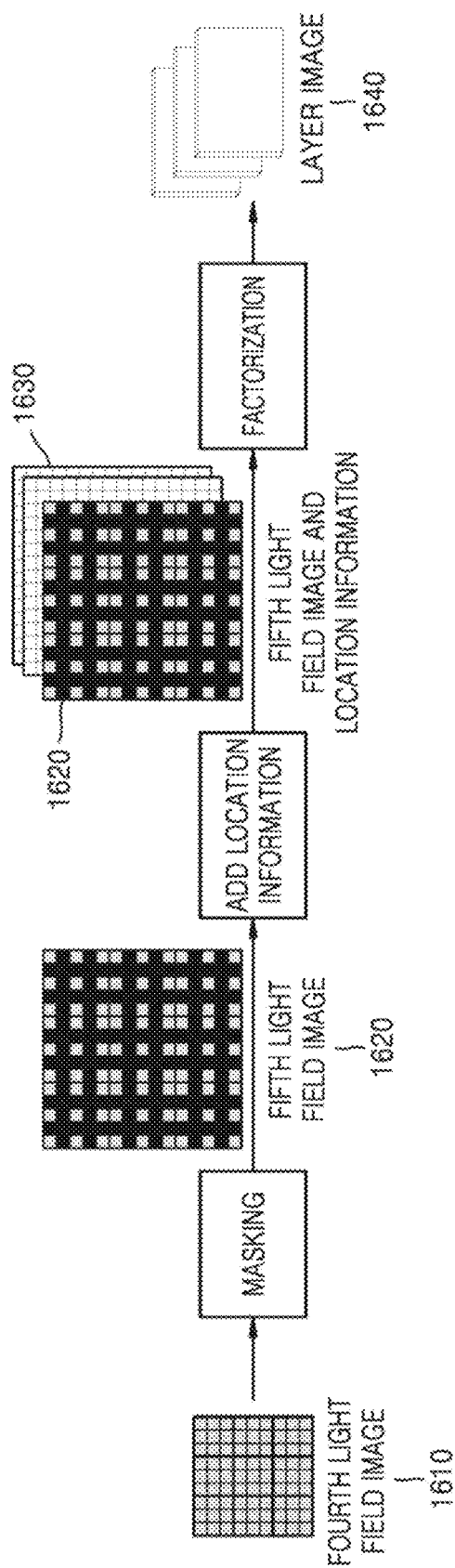
FIG. 16 is a diagram for describing a process of performing factorization using a trained artificial intelligence model by an electronic device according to an embodiment of the disclosure.

FIG. 16 is a diagram for describing a process of performing factorization using a trained artificial intelligence model by the electronic device 100 according to an embodiment of the disclosure.

According to an embodiment of the disclosure, the electronic device 100 may obtain a fourth light field image 1610 with a fourth number of views. For example, the electronic device 100 may receive the fourth light field image 1610 with 3×3 views having a resolution of 3×3.

According to an embodiment of the disclosure, the electronic device 100 may determine whether the number of views of the fourth light field image 1610 is suitable for a viewing angle of a display for rendering a layer image 1640. For example, when the number of views corresponding to the viewing angle of the display is 5×5, the number of views of the fourth light field image 1610 is 3×3 and thus is different from the number of views corresponding to the viewing angle of the display, and therefore, the electronic device 100 may determine that the number of views of the fourth light field image 1610 is not suitable for the viewing angle of the display for rendering the layer image 1640.

According to an embodiment of the disclosure, when the number of views of the fourth light field image 1610 is not suitable for the viewing angle of the display for rendering the layer image 1640, the electronic device 100 may determine whether a display between the views of the fourth light field image 1610 is uniform and obtain a fifth light field image 1620, based on a result of the determining. When the disparity between the views of the fourth light field image 1610 is uniform or is not uniform, the electronic device 100 may perform masking on the fourth light field image 1610. Therefore, the electronic device 100 may obtain the fifth light field image 1620 with 3×3 views having a format of 5×5.

According to an embodiment of the disclosure, the electronic device 100 may obtain location information 1630 corresponding to each of sub-pixels in the fifth light field image 1620. For example, when the fifth light field image 1620 has a format of 5×5 and a resolution of 3×3, the electronic device 100 may obtain the location information 1630 corresponding to each of the sub-pixels in the fifth light field image 1620.

According to an embodiment of the disclosure, the electronic device 100 may obtain the layer image 1530 by inputting the fifth light field image 1620 and the location information 1630 to a trained artificial intelligence model.

Figure 17:
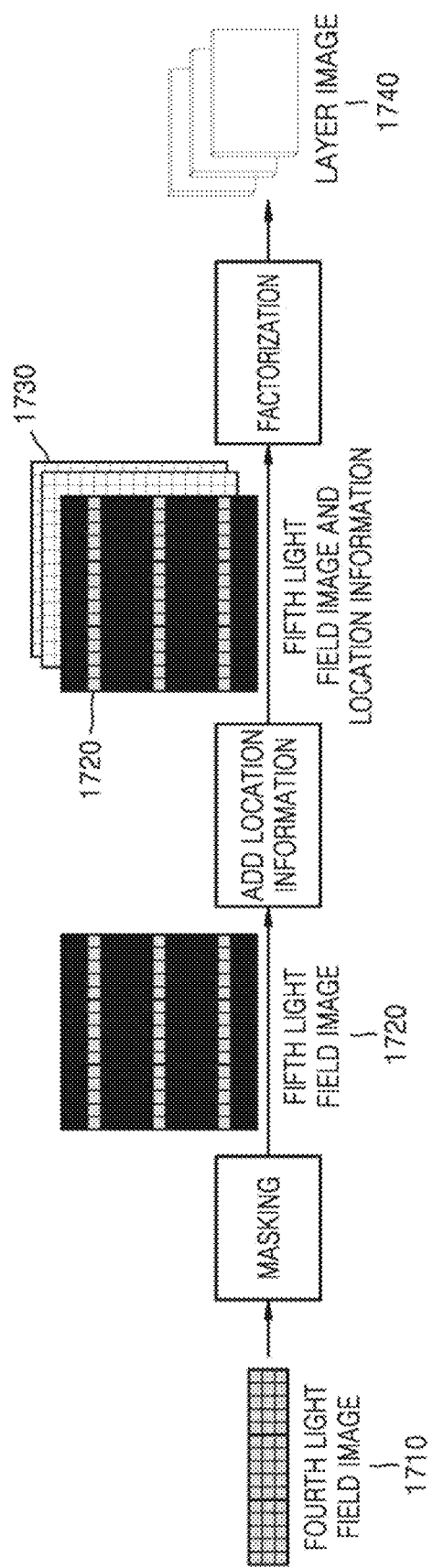
FIG. 17 is a diagram for describing a process of performing factorization using a trained artificial intelligence model by an electronic device according to an embodiment of the disclosure.

FIG. 17 is a diagram for describing a process of performing factorization using a trained artificial intelligence model by the electronic device 100 according to an embodiment of the disclosure.

According to an embodiment of the disclosure, the electronic device 100 may obtain a fourth light field image 1710 with a fourth number of views. For example, the electronic device 100 may receive the fourth light field image 1710 with 1×5 views having a resolution of 3×3.

According to an embodiment of the disclosure, the electronic device 100 may determine whether the number of views of the fourth light field image 1710 is suitable for a viewing angle of a display for rendering a layer image 1740. For example, when the number of views corresponding to the viewing angle of the display is 5×5, the number of views of the fourth light field image 1710 is 1×5 and thus is different from the number of views corresponding to the viewing angle of the display, and therefore, the electronic device 100 may determine that the number of views of the fourth light field image 1710 is not suitable for the viewing angle of the display for rendering the layer image 1710.

According to an embodiment of the disclosure, when the number of views of the fourth light field image 1710 is not suitable for the viewing angle of the display for rendering the layer image 1740, the electronic device 100 may determine whether a display between the views of the fourth light field image 1710 is uniform and obtain a fifth light field image 1620, based on a result of the determining. For example, when the disparity between the views of the fourth light field image 1710 is uniform or is not uniform, the electronic device 100 may perform masking on the fourth light field image 1710. Therefore, the electronic device 100 may obtain the fifth light field image 1720 with 1×5 views having a format of 5×5.

According to an embodiment of the disclosure, the electronic device 100 may obtain location information 1730 corresponding to each of sub-pixels in the fifth light field image 1720. For example, when the fifth light field image 1720 has a format of 5×5 and a resolution of 3×3, the electronic device 100 may obtain the location information 1730 corresponding to each of the sub-pixels in the fifth light field image 1720.

According to an embodiment of the disclosure, the electronic device 100 may obtain the layer image 1740 by inputting the fifth light field image 1720 and the location information 1730 to a trained artificial intelligence model.

Figure 18:
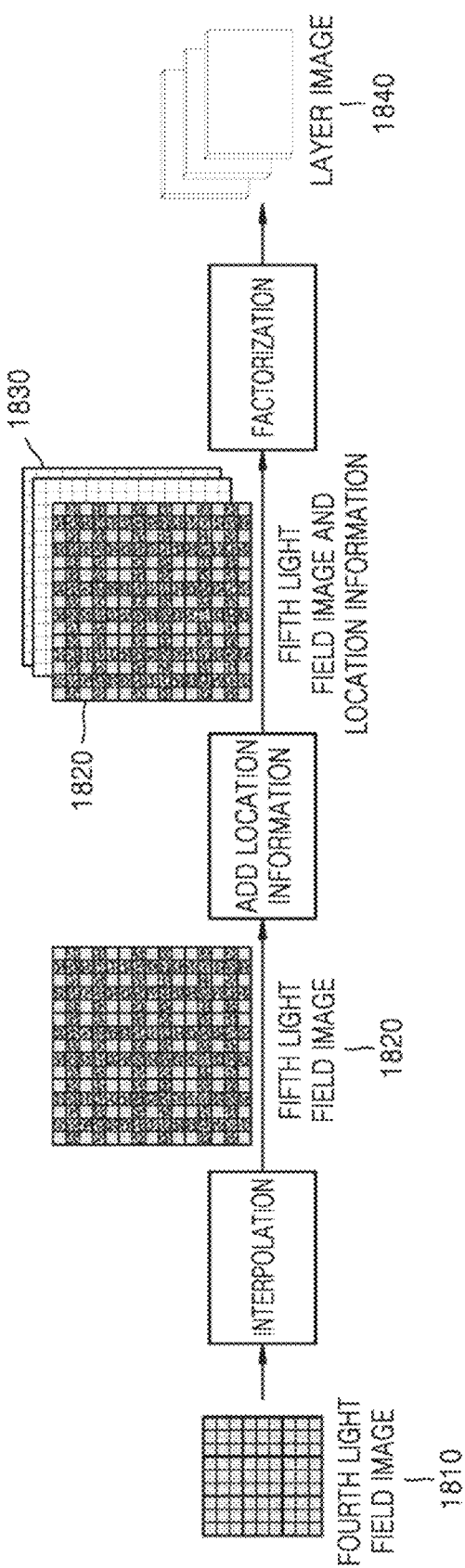
FIG. 18 is a diagram for describing a process of performing factorization using a trained artificial intelligence model by an electronic device according to an embodiment of the disclosure.

FIG. 18 is a diagram for describing a process of performing factorization using a trained artificial intelligence model by the electronic device 100 according to an embodiment of the disclosure.

According to an embodiment of the disclosure, the electronic device 100 may obtain a fourth light field image 1810 with a fourth number of views. For example, the electronic device 100 may receive the fourth light field image 1810 with 3×3 views having a resolution of 3×3.

According to an embodiment of the disclosure, the electronic device 100 may determine whether the number of views of the fourth light field image 1810 is suitable for a viewing angle of a display for rendering a layer image 1840. For example, when the number of views corresponding to the viewing angle of the display is 5×5, the number of views of the fourth light field image 1810 is 3×3 and thus is different from the number of views corresponding to the viewing angle of the display, and therefore, the electronic device 100 may determine that the number of views of the fourth light field image 1810 is not suitable for the viewing angle of the display for rendering the layer image 1840.

According to an embodiment of the disclosure, when the number of views of the fourth light field image 1810 is not suitable for the viewing angle of the display for rendering the layer image 1840, the electronic device 100 may determine whether a display between the views of the fourth light field image 1810 is uniform and obtain a fifth light field image 1820, based on a result of the determining. For example, when the disparity between the views of the fourth light field image 1810 is uniform, the electronic device 100 may perform interpolation on the fourth light field image 1810. Therefore, the electronic device 100 may obtain the fifth light field image 1820 with 3×3 views having a format of 5×5.

According to an embodiment of the disclosure, the electronic device 100 may obtain location information 1830 corresponding to each of sub-pixels in the fifth light field image 1820. For example, when the fifth light field image 1820 has a format of 5×5 and a resolution of 3×3, the electronic device 100 may obtain the location information 1830 corresponding to each of the sub-pixels in the fifth light field image 1820.

According to an embodiment of the disclosure, the electronic device 100 may obtain the layer image 1840 by inputting the fifth light field image 1820 and the location information 1830 to a trained artificial intelligence model.

Figure 19:
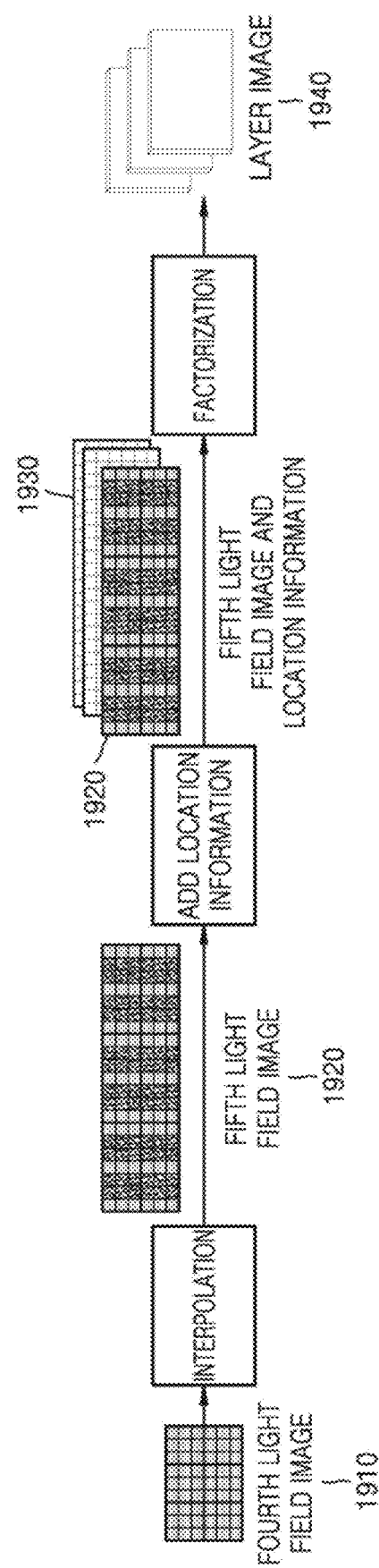
FIG. 19 is a diagram for describing a process of performing factorization using a trained artificial intelligence model by an electronic device according to an embodiment of the disclosure.

FIG. 19 is a diagram for describing a process of performing factorization using a trained artificial intelligence model by the electronic device 100 according to an embodiment of the disclosure.

According to an embodiment of the disclosure, the electronic device 100 may obtain a fourth light field image 1910 with a fourth number of views. For example, the electronic device 100 may receive the fourth light field image 1910 with 3×3 views having a resolution of 3×2.

According to an embodiment of the disclosure, the electronic device 100 may determine whether the number of views of the fourth light field image 1910 is suitable for a viewing angle of a display for rendering a layer image 1940. For example, when the number of views corresponding to the viewing angle of the display is 3×7, the number of views of the fourth light field image 1910 is 3×3 and thus is different from the number of views corresponding to the viewing angle of the display, and therefore, the electronic device 100 may determine that the number of views of the fourth light field image 1910 is not suitable for the viewing angle of the display for rendering the layer image 1940.

According to an embodiment of the disclosure, when the number of views of the fourth light field image 1910 is not suitable for the viewing angle of the display for rendering the layer image 1940, the electronic device 100 may determine whether a display between the views of the fourth light field image 1910 is uniform and obtain a fifth light field image 1920, based on a result of the determining. For example, when the disparity between the views of the fourth light field image 1910 is uniform, the electronic device 100 may perform interpolation on the fourth light field image 1910. Therefore, the electronic device 100 may obtain the fifth light field image 1920 with 3×3 views having a format of 3×7.

According to an embodiment of the disclosure, the electronic device 100 may obtain location information 1930 corresponding to each of sub-pixels in the fifth light field image 1920. For example, when the fifth light field image 1920 has a format of 3×7 and a resolution of 3×2, the electronic device 100 may obtain the location information 1930 corresponding to each of the sub-pixels in the fifth light field image 1920.

According to an embodiment of the disclosure, the electronic device 100 may obtain the layer image 1940 by inputting the fifth light field image 1920 and the location information 1930 to a trained artificial intelligence model.

Figure 20:
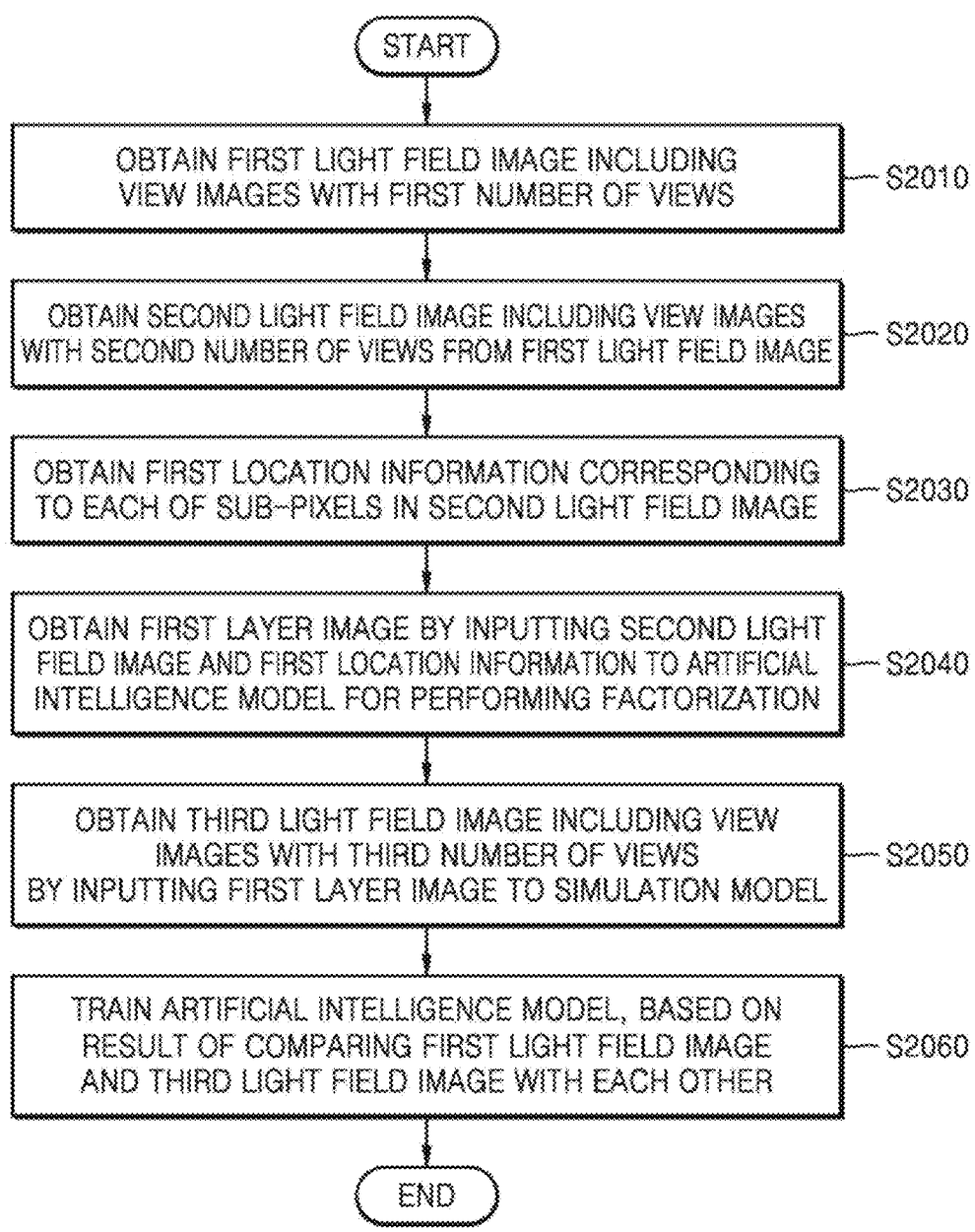
FIG. 20 is a flowchart of a process of training an artificial intelligence model, which performs factorization, by an electronic device according to an embodiment of the disclosure.

FIG. 20 is a flowchart of a process of training an artificial intelligence model, which performs factorization, by an electronic device according to an embodiment of the disclosure.

In operation S2010, the electronic device may obtain a first light field image including view images with a first number of views.

According to an embodiment of the disclosure, when the electronic device includes a light field camera, the electronic device may obtain the first light field image with the first number of views through the light field camera. When the electronic device includes a transceiver, the electronic device may receive the first light field image with the first number of views from an external light field camera or an external electronic device.

In operation S2020, the electronic device may obtain a second light field image including view images with a second number of views from the first light field image.

In an embodiment of the disclosure, the electronic device may determine the second number of views, based on the number of input views and the number of output views of a scenario to be handled using an artificial intelligence model or a disparity between views of the first light field image, and obtain the second light field image with the second number of views by performing masking on interpolation on the first light field image. For example, the electronic device may determine the number of input views as the second number of views, based on the number of input views and the number of output views of the scenario to be handled using the artificial intelligence model, and obtain the second light field image including view images with the number of input views from the first light field image.

According to an embodiment of the disclosure, when the disparity between the views of the first light field image is not uniform, the electronic device may perform masking on the first light field image to obtain the second light field image with the second number of views. When the disparity between the views of the first light field image is not uniform, the electronic device may perform masking or interpolation on the first light field image to obtain the second light field image with the second number of views.

In operation S2030, the electronic device may obtain first location information corresponding to each of sub-pixels in the second light field image.

In operation S2040, the electronic device may obtain a first layer image by inputting the second light field image and the first location information to an artificial intelligent model for performing factorization.

In an embodiment of the disclosure, the electronic device may obtain a flow value by inputting the second light field image and the first location information to an artificial intelligent model for obtaining a flow value. Thereafter, the electronic device may obtain the first light field image in which pixel values are moved by performing the warping technique on the first light field image, based on the flow value.

In operation S2050, the electronic device may obtain a third light field image including view images with a third number of views by inputting the first layer image to a simulation model.

In an embodiment of the disclosure, the electronic device may obtain a third light field image with the number of output views, based on the number of input views and the number of output views of the scenario to be handled using the artificial intelligence model.

In operation S2060, the electronic device may train the artificial intelligence model, based on a result of comparing the first light field image and the third light field image with each other.

According to an embodiment of the disclosure, the electronic device may obtain a loss function by comparing the first light field image and the third light field image with each other, and train the artificial intelligence model by calculating a loss, based on the loss function.

According to an embodiment of the disclosure, when the electronic device obtains a flow value and performs the wiping technique, the electronic device may train the artificial intelligence model, based on a result of comparing the first light field image and the third light field image with each other by performing the warping technique.

According to an embodiment of the disclosure, when the number of views of the first light field image and the number of views of the third light field image are different from each other, the electronic device may select an effective region of the first light field image such that the number of views of the first light field image and the number of views of the third light field image may be the same. Thereafter, the electronic device may train the artificial intelligence model, based on the result of comparing the first light field image in which the effective region is selected with the third light field image.

The invention claimed is:

1. An electronic device comprising:
a display comprising a plurality of stacked panels;
a memory storing at least one instruction; and
at least one processor,
wherein the at least one processor is configured to execute the at least one instruction to:
obtain a first light field image including view images with a first number of views;
perform masking or interpolation on the first light field with the first number of views to obtain a second light field image including view images with a second number of views;
obtain first location information corresponding to locations within the second light field image of sub-pixels included in each view image of the second light field image;
obtain a first layer image by inputting the second light field image and the first location information to an artificial intelligence model configured to perform factorization, the first layer image comprising a plurality of layer images corresponding to the plurality of stacked panels;
obtain a third light field image including view images with a third number of views, by inputting the first layer image to a simulation model configured to restore a light field image from a layer image; and
train the artificial intelligence model, based on a result of comparing the first light field image and the third light field image.

2. The electronic device of claim 1,
wherein the first number of views is different from the second number of views.

3. The electronic device of claim 2, wherein, during the obtaining of the second light field image with the second number of views by performing masking on the first light field image, the at least one processor is further configured to:
determine the second number of views, based on a disparity between views of the first light field image;
generate a mask, based on the second number of views; and
perform masking on the first light field image, based on the generated mask.

4. The electronic device of claim 2, wherein, during the obtaining of the second light field image with the second number of views by performing masking on the first light field image, the at least one processor is further configured to:
determine the second number of views, based on a user input;
generate a mask, based on the second number of views; and
perform masking on the first light field image, based on the generated mask.

5. The electronic device of claim 2, wherein, during the obtaining of the second light field image with the second number of views by performing interpolation on the first light field image, the at least one processor is further configured to perform interpolation on a sub-sampled light field image obtained by performing sub-sampling on the first light field image.

6. The electronic device of claim 1, wherein the at least one processor is further configured to:
obtain a fourth light field image with a fourth number of views;
when the fourth number of views is less than a number of views corresponding to a viewing angle of a display, obtain a fifth light field image with a same number of formats as the number of views corresponding to the viewing angle of the display by changing a format of the fourth light field image;
obtain second location information corresponding to each sub-pixel of a plurality of sub-pixels in the fourth light field image or the fifth light field image; and
obtain a second layer image by inputting one of the fourth light field image and the fifth light field image and the second location information to the trained artificial intelligence model.

7. The electronic device of claim 6, wherein, during the obtaining of the fifth light field image, the at least one processor is further configured to perform masking on the fourth light field image to obtain the fifth light field image when a disparity between views of the fourth light field image is not uniform.

8. The electronic device of claim 6, wherein, during the obtaining of the fifth light field image, the at least one processor is further configured to perform masking or interpolation on the fourth light field image to obtain the fifth light field image when a disparity between views of the fourth light field image is uniform.

9. The electronic device of claim 6, further comprising the display, and
wherein the at least one processor is further configured to render the second layer image on the display.

10. The electronic device of claim 6, further comprising a transceiver, and
wherein the at least one processor is further configured to transmit the second layer image to the display through the transceiver, and
the second layer image is rendered on the display.

11. A method performed by an electronic device that includes a display including a plurality of stacked panels, the method comprising:
obtaining a first light field image including view images with a first number of views;
obtaining, from the first light field image, a second light field image including view images with a second number of views, wherein the obtaining the second light field image comprises masking the first light field image with the first number of views or interpolating the first light field image with the first number of views;
obtaining first location information corresponding to locations within the second light field image of sub-pixels included in each view image of the second light field image;
obtaining a first layer image by inputting the second light field image and the first location information to an artificial intelligence model configured to perform factorization, the first layer image including a plurality of layer images corresponding to the plurality of stacked panels;
obtaining a third light field image including view images with a third number of views, by inputting the first layer image to a simulation model configured to restore a light field image from a layer image; and
training the artificial intelligence model, based on a result of comparing the first light field image and the third light field image.

12. The method of claim 11, wherein
the first number of views is different from the second number of views.

13. The method of claim 12, wherein the obtaining of the second light field image with the second number of views by performing masking on the first light field image comprises:
determining the second number of views, based on a disparity between the views of the first light field image;
producing a mask, based on the second number of views; and
performing masking on the first light field image, based on the generated mask.

14. The method of claim 12, wherein the obtaining of the second light field image with the second number of views by performing masking on the first light field image comprises:
determining the second number of views, based on a user input;
producing a mask, based on the second number of views; and
performing masking on the first light field image, based on the generated mask.

15. The method of claim 12, wherein the obtaining of the second light field image with the second number of views by interpolating the first light field image comprises interpolating a sub-sampled light field image obtained by performing sub-sampling on the first light field image.

16. The method of claim 11, further comprising:
obtaining a fourth light field image with a fourth number of views;
when the fourth number of views is less than a number of views corresponding to a viewing angle of a display, obtaining a fifth light field image with a same number of formats as the number of views corresponding to the viewing angle of the display by changing a format of the fourth light field image;
obtaining second location information corresponding to each sub-pixel of a plurality of sub-pixels in the fourth light field image or the fifth light field image; and
obtaining a second layer image by inputting one of the fourth light field image and the fifth light field image and the second location information to the trained artificial intelligence model.

17. The method of claim 16, wherein the obtaining of the fifth light field image comprises obtaining the fifth light field image by performing masking on the fourth light field image when a disparity between the views of the fourth light field image is not uniform.

18. The method of claim 16, wherein the obtaining of the fifth light field image comprises obtaining the fifth light field image by performing masking or interpolation on the fourth light field image when a disparity between the views of the fourth light field image is uniform.

19. The method of claim 16, further comprising rendering the second layer image on the display.

20. A non-transitory computer-readable recording medium of an electronic device that includes a display including a plurality of stacked panels, the non-transitory computer-readable recording medium having recorded thereon a program for causing a computer to perform a method comprising:
obtaining a first light field image including view images with a first number of views;
obtaining, from the first light field image, a second light field image including view images with a second number of views, wherein the obtaining the second light field image comprises masking the first light field image with the first number of views or interpolating the first light field image with the first number of views;
obtaining first location information corresponding to locations within the second light field image of sub-pixels included in each view image of the second light field image;
obtaining a first layer image by inputting the second light field image and the first location information to an artificial intelligence model configured to perform factorization, the first layer image including a plurality of layer images corresponding to the plurality of stacked panels;
obtaining a third light field image including view images with a third number of views, by inputting the first layer image to a simulation model configured to restore a light field image from a layer image; and
training the artificial intelligence model, based on a result of comparing the first light field image and the third light field image.

* * * * *